United States Patent
Miwa

(10) Patent No.: US 7,106,423 B2
(45) Date of Patent: Sep. 12, 2006

(54) DISTANCE MEASURING DEVICE

(75) Inventor: Yasuhiro Miwa, Saitama (JP)

(73) Assignee: Fujinon Corporation, Saitama (JP)

( * ) Notice: Subject to any disclaimer, the term of this patent is extended or adjusted under 35 U.S.C. 154(b) by 403 days.

(21) Appl. No.: 10/809,480

(22) Filed: Mar. 26, 2004

(65) Prior Publication Data

US 2004/0189975 A1   Sep. 30, 2004

(30) Foreign Application Priority Data

Mar. 27, 2003  (JP) .............................. 2003-088610

(51) Int. Cl.
G01C 3/08 (2006.01)
G03B 7/099 (2006.01)
G03B 13/00 (2006.01)
G03B 7/097 (2006.01)
G02B 7/28 (2006.01)

(52) U.S. Cl. ..................................... 356/4.06; 396/106

(58) Field of Classification Search ............... 356/4.06, 356/4.07, 4.01; 396/98, 106, 120, 125
See application file for complete search history.

(56) References Cited

U.S. PATENT DOCUMENTS

| 4,773,751 A | 9/1988 | Matsuda et al. |
| 6,026,246 A | 2/2000 | Yoshida et al. |
| 6,928,240 B1 * | 8/2005 | Miwa .......................... 396/106 |
| 2004/0202462 A1* | 10/2004 | Miwa .......................... 396/106 |

FOREIGN PATENT DOCUMENTS

| JP | 10-281756 | 10/1998 |
| JP | 11-281882 | 10/1999 |

* cited by examiner

Primary Examiner—Hwa (Andrew) Lee
(74) Attorney, Agent, or Firm—Leydig, Voit & Mayer, Ltd.

(57) ABSTRACT

A distance measuring device includes a light emitter, a light detector, a clamp that outputs long-range side signal or clamp signal, a calculator that calculates the ratio between the short-range side signal and the signal output from the clamp and outputs a ratio signal, a light meter measuring the luminance of outside light, a threshold setter that sets up an infinity determination threshold value such that a lower luminance of the outside light corresponds to the longer range side as a threshold value; a converter that, when the output ratio signal is the signal corresponding to the short range side and is shorter than the infinity determination threshold value, converts the output ratio signal into a distance signal, and, if not, converts the output ratio signal into a distance signal having a fixed value.

6 Claims, 16 Drawing Sheets

| | LOW LUMINANCE ← Lv12 | | Lv15 → HIGH LUMINANCE |
|---|---|---|---|
| | LOW LUMINANCE RANGE | MEDIUM LUMINANCE RANGE | HIGH LUMINANCE RANGE |
| INFINITY DETERMINATION THRESHOLD VALUE | FIRST LEVEL VALUE | SECOND LEVEL VALUE | SECOND LEVEL VALUE |
| CONVERSION EXPRESSION PARAMETER | (A2,B2) (A3,B3) | (A2,B2) (A3,B3) | (A2,B2) |

Fig.11

| | LOW LUMINANCE RANGE | MEDIUM LUMINANCE RANGE | HIGH LUMINANCE RANGE |
|---|---|---|---|
| INFINITY DETERMINATION THRESHOLD VALUE | FIRST LEVEL VALUE | SECOND LEVEL VALUE | SECOND LEVEL VALUE |
| CONVERSION EXPRESSION PARAMETER | (A2,B2) (A3,B3) | (A2,B2) (A3,B3) | (A2,B2) |

← LOW LUMINANCE    Lv12    Lv15    HIGH LUMINANCE →

DISTANCE MEASURING DEVICE

BACKGROUND OF THE INVENTION

1. Field of the Invention

The present invention relates to an active distance measuring device suitably used for cameras or the like.

2. Related Background Art

Conventionally, as an active distance measuring device for cameras, a distance measuring device disclosed in Japanese Unexamined Patent Application Publication No. H-10-281756 is known. That is, when an output ratio signal is converted in a CPU into an distance signal corresponding to the distance, in the case where the output ratio signal is at the nearer-side of a clamping effect Y/N determination reference level, which is defined based on the reference object reflectance, the output ratio signal is converted in accordance with a first conversion expression. While, in the case where the output ratio signal is not at the nearer-side of a clamping effect Y/N determination reference level, the output ratio signal is converted in accordance with any one of a first conversion expression and a second conversion expression corresponding to the luminance of the outside light. In the above distance measuring device, when converting the AF signal value into a distance signal value, it is arranged so that, in the case where the AF signal value is at the long-range side more than predetermined threshold value, every signal at the long-range side than that is converted into an infinity signal value corresponding to a predetermined infinity setting value. Owing to this, an object at a long range results in a faint AF signal value; and thus even when the component of noise is not negligible, a precise measurement can be obtained.

Further, in a distance measuring device disclosed in Japanese Unexamined Patent Application Publication No. S-60-189720, it is arranged so that the infinite distance position is determined by level determination means corresponding to the luminance of the object.

[Patent Document 1]
Japanese Unexamined Patent Application Publication (Tokukai) No. H-10-281756
[Patent Document 2]
Japanese Unexamined Patent Application Publication (Tokukai) No. S-60-189720

In the distance measuring device disclosed in Japanese Unexamined Patent Application Publication No. H-10-281756, for example, when the luminance of the outside light is low, since component of noise is small, a precise distance measurement is possible up to a longer distance than the case when the luminance of the outside light is high. However, in the above distance measuring device, since the threshold value is set to a fixed value, the infinite distance determination is made within the short-range side where the AF signal value does not reach a long range limit that is capable of a precise distance measurement. Accordingly, the AF signal value is converted to the infinity signal value corresponding to the predetermined infinity setting value (refer to FIG. 14A). That is, the limit distance (hereinafter, referred to as "reachable distance"), which is capable of obtaining appropriate distance signal corresponding to the distance with respect to the object to be measured, becomes short. FIGS. 14A–14C show graphs for demonstrating the relationship between the distance and the distance signal when the distance measurement is made using the above-described distance measuring device under a condition of 36% object reflectance. FIG. 14A shows a result of distance measurement under a condition of low luminance of the outside light (Lv=7); FIG. 14B shows a result of distance measurement under a condition of medium luminance of the outside light (Lv=14); and FIG. 14C shows a result of distance measurement under a condition of high luminance of the outside light (Lv=16).

Particularly, in the case where the reflectance of the object to be measured is low, since the AF signal becomes faint in the nearer-distance side than that of the case where the reflectance is high, the AF signal is converted to the predetermined signal value in further nearer-distance side (Refer to FIG. 15A). The graph, which represents the relationship between the converted distance signal value and the distance, largely deviates out of an ideal linear graph, and exceeds the line (broken line in the graph), which indicates allowable range of error in the distance measurement to the long range side; thus there may be a case that the error in the distance measurement exceeds the allowable range. FIGS. 15A–15C are graphs, which represent the relationship between the distance and the distance signal when the distance measurement is made under a condition of 9% object reflectance using the above distance measuring device. FIG. 15A shows a result of the distance measurement under a condition of low luminance of the outside light (Lv=7); FIG. 15B shows a result of the distance measurement under a condition of medium luminance of the outside light (Lv=14); and FIG. 15C shows a result of the distance measurement under a condition of high luminance of the outside light (Lv=16). Further, the area enclosed by the two broken lines in FIG. 15 indicates the allowable range of error in the distance measurement.

Also, in a distance measuring device disclosed in Japanese Unexamined Patent Application publication No. 1985-189720, since the setting of the determination level of the infinite long distance is altered in order to cope with the noise of external light, when the luminance of the outside light is high, the influence of the external light becomes large in an area a little closer to the short range, which is determined as infinite long distance, resulting in poor distance measuring property. As a result, the graph exceeds the allowable range of error in distance measurement to the short-range side (refer to FIG. 16C). FIGS. 16A–16C are graphs showing the relationship between the distance and the distance signal when a distance measurement is made using the distance measuring device disclosed in Japanese Unexamined Patent Application Publication No. S-60-189720 under a condition of 36% object reflectance. FIG. 16A shows a result of the distance measurement under a condition of low luminance of the outside light (Lv=7); FIG. 16B shows a result of the distance measurement under a condition of medium luminance of the outside light (Lv=14); and FIG. 16C shows a result of the distance measurement under a condition of high luminance of the outside light (Lv=16). Further, the area enclosed by the two broken lines in FIG. 16 indicates the allowable range of error in the distance measurement.

As described above, in conventional distance measuring devices, there reside such problems that, when the luminance of the outside light is changed, satisfactory reachable distance can not be obtained resulting in poor distance measuring property or the like.

SUMMARY OF THE INVENTION

The present invention has been proposed to solve the above-described problems. An object of the present invention is to provide a distance measuring device, which ensures the reachable distance when the luminance of the outside light is low, and is capable of obtaining satisfactorily distance measuring property at a long range.

In order to solve the above-described problems, a distance measuring device in accordance with the present invention is characterized by comprising: light emitting means that outputs a beam of light to an object to be measured; light receiving means that receives reflected light of the beam of light projected onto the object to be measured at a light receiving position corresponding to a distance to the object to be measured, and based on the light receiving position, outputs a long-range side signal such that, if the received light amount is constant, the longer distance results in the larger value and a short-range side signal such that, if the received light amount is constant, the shorter distance results in the larger value; calculation means that calculates a ratio between the short-range side signal and a signal output from the long-range side signal to output an output ratio signal; luminance measuring means that measures the luminance of the outside light; threshold setting means that sets up an infinity determination threshold value such that the lower luminance of the outside light measured by the luminance measuring means corresponds to the longer range side as a threshold, and sets up the same such that the higher luminance corresponds to the shorter range side as a threshold; and conversion means that, when the output ratio signal is the signal corresponding to the short range side shorter than the infinity determination threshold value, converts the output ratio signal into a distance signal using a predetermined conversion expression, and when the output ratio signal is not the signal corresponding to the short range side shorter than the infinity determination threshold value, converts the same into a predetermined distance signal having a fixed value.

According to this distance measuring device, the infinity determination threshold value increases or decreases corresponding to the luminance of the outside light. When the luminance of the outside light is low, the infinity determination threshold value is set up in the long-range side. Accordingly, the distance signal is not converted into a predetermined fixed value until a relatively long range is obtained in the conversion means, and the distance signal corresponding to the AF signal can be obtained up to a relatively long range. Thus, even when the luminance of the outside light is low, a long reachable distance is ensured.

Also, the distance measuring device in accordance with the present invention is characterized by comprising: light emitting means that outputs a beam of light to an object to be measured; light receiving means that receives reflected light of the beam of light projected onto the object to be measured at a light receiving position corresponding to a distance to the object to be measured, and based on the light receiving position, outputs a long-range side signal such that, if the received light amount is constant, the longer distance results in the larger value and a short-range side signal such that, if the received light amount is constant, the shorter distance results in the larger value; clamping means that inputs the long-range side signal to compare the magnitude of level between the long-range side signal and a clamp signal; when the level of the long-range side signal is larger than the level of the clamp signal, outputs the long-range side signal as it is; and when the long-range side signal is not larger than the level of the clamp signal, outputs the clamp signal; calculation means that calculates the ratio between the short-range side signal and the signal output from the clamping means to output an output ratio signal; luminance measuring means that measures the luminance of the outside light;

threshold setting means that sets up an infinity determination threshold value such that the lower luminance of the outside light measured by the luminance measuring means corresponds to the longer range side as a threshold, and sets up the same such that the higher luminance corresponds to the shorter range side as a threshold; and conversion means that, when the output ratio signal is the signal corresponding to the short range side shorter than the infinity determination threshold value, converts the output ratio signal into a distance signal using a predetermined conversion expression, and when the output ratio signal is not the signal corresponding to the short range side shorter than the infinity determination threshold value, converts the same into a predetermined distance signal having a fixed value.

Further, the distance measuring device may be characterized in that, when the luminance of the outside light measured by the luminance measuring means is lower than a predetermined first luminance level, the threshold setting means sets up the infinity determination threshold value as a first level value: and when the luminance of the outside light is not lower than the first luminance level, sets up the same as a second level value corresponding to short range side shorter than the first level value According to this distance measuring device, the infinity determination threshold value is divided into two steps only based on the luminance of the outside light. Compared to the case where the infinity determination threshold value is obtained as a continuous value, the capacity of the program and the processing time can be saved.

Furthermore, the distance measuring device may be characterized in that the conversion means, in the case of the signal of which value of the output ratio signal corresponds to the short range side shorter than the infinity determination threshold value, when the output ratio signal is at the a shorter side than clamping effect Y/N determination reference level defined by reference object reflectance, converts the output ratio signal into a distance signal corresponding to the distance in accordance with a first conversion expression, in the case where the output ratio signal is not at the shorter side than the clamping effect Y/N determination reference level defined by reference object reflectance, converts the output ratio signal into a distance signal corresponding to the distance in accordance with the first conversion expression when the luminance of the outside light measured by the luminance measuring means is higher than a predetermined second luminance level; and in accordance with a second conversion expression when the luminance of the outside light is higher than the second luminance level; the first conversion expression converts the output ratio signal into a distance signal of the long range side longer than the second conversion expression.

According to this distance measuring device, it is arranged so that, when converting an AF signal, which is shorter than the clamping effect Y/N determination reference level, in the case where the luminance of the outside light is higher than the predetermined level, the AF signal is converted into a distance signal in the long range side longer than the case of low luminance. The AF signal, which is apt to be biased to the short-range side due to the influence of the luminance of the outside light, is converted appropriately resulting in an increased accuracy in the distance measurement.

BRIEF DESCRIPTION OF THE DRAWINGS

FIG. 11 is a diagram showing the classification of ranges based on the external luminance.

FIG. 12A shows a result of the distance measurement under a condition of low luminance; FIG. 12B shows a result of the distance measurement under a condition of medium luminance; and FIG. 12C shows a result of the distance measurement under a condition of high luminance.

FIG. 13A shows the result of distance measurement under a condition in which the luminance of the outside light is low luminance; FIG. 13B shows the result of distance measurement under a condition in which the luminance of the outside light is medium luminance; and FIG. 13C shows the result of distance measurement under a condition in which the luminance of the outside light is high luminance.

FIG. 14A shows a result of distance measurement under a condition of low luminance of the outside light; FIG. 14B shows a result of distance measurement under a condition of medium luminance of the outside light; FIG. 14C shows a result of distance measurement under a condition of high luminance of the outside light.

FIG. 15A shows a result of the distance measurement under a condition of low luminance of the outside light; FIG. 15B shows a result of the distance measurement under a condition of medium luminance of the outside light; and FIG. 15C shows a result of the distance measurement under a condition of high luminance of the outside light.

FIG. 16A shows a result of the distance measurement under a condition of low luminance of the outside light; FIG. 16B shows a result of the distance measurement under a condition of medium luminance of the outside light; and FIG. 16C shows a result of the distance measurement under a condition of high luminance of the outside light.

DESCRIPTION OF THE PREFERRED EMBODIMENTS

Figure 1:
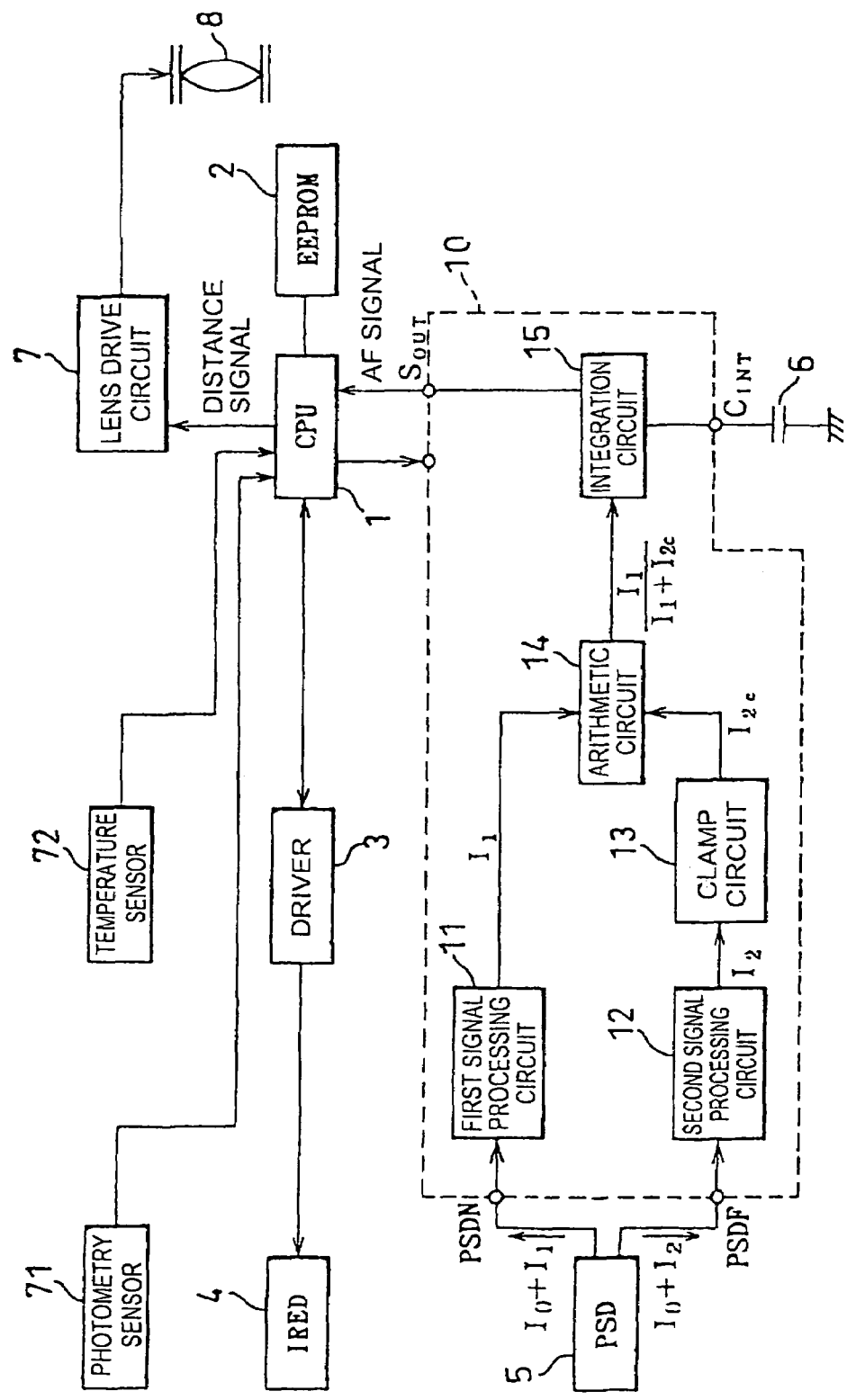
FIG. 1 is a diagram showing a configuration of the distance measuring device in accordance with the embodiment.

Hereinafter, referring to the accompanying drawings, embodiments in accordance with the present invention will be described in detail. In the descriptions of the drawings, identical elements will be given with identical reference numerals and letters, and redundant descriptions will be omitted. First of all, the entire constitution of a distance measuring device in accordance with this embodiment will be described. FIG. 1 is a diagram showing a configuration of the distance measuring device in accordance with the embodiment.

A CPU 1 controls the entire camera that is provided with the distance measuring device. The CPU 1 controls the entire camera including the distance measuring device based on program and parameter, which are previously stored in an EEPROM 2. In the distance measuring device shown in FIG. 1, the CPU 1 controls a driver 3 to control the emission of the infrared light from an IRED 4, and inputs a value of the power supply voltage, which is supplied to the driver 3 (or, power supply voltage, which is obtained from the drive current supplied from the driver 3 to the IRED 4). Also, the CPU 1 controls the operation of an auto-focusing IC (hereinafter, referred to as "AFIC") 10, and inputs AF signal, which is output from the AFIC 10. Further, the CPU 1 inputs a value of luminance of the outside light, which is measured by a photometry sensor 71; and inputs a value of temperature, which is measured by a temperature sensor 72. As for the power supply voltage, it is not limited to the driver 3 or IRED 4, but voltage of a battery may be directly measured; or voltage supplied to other component part may be measured.

The infrared light emitted from the IRED 4 is projected onto an object to be measured through a projection lens (not shown), which is disposed in front of the IRED 4, and a portion thereof is reflected. The reflected light is received at any position on the light receiving plane of the PSD 5 through a light receiving lens (not shown) disposed in front of the PSD 5, which is a photo sensitive detector. The light receiving position corresponds to the distance to the object to be measured. The PSD 5 outputs two signals I1 and I2 corresponding to the light receiving position. The signal I1 is a short-range side signal, in which, if the received light amount is constant, the closer distance results in the larger value; the signal I2 is a long-range side signal, in which, if the received light amount is constant, the longer distance results in the larger value. The sum of the signals I1 and I2 represents the amount of the reflected light received by the PSD 5. The output ratio (I1/(I1+I2)) represents the light receiving position on the light receiving plane of the PSD 5;

i.e., the distance to the object to be measured. The short-range side signal I1 is input to the PSDN terminal of the AFIC 10; the long-range side signal I2 is input to the PSDF terminal of the AFIC 10. However, practically, there may be a case where a signal, in which each of the short-range side signal I1 and the long-range side signal I2 is added with component of ambient light I0 depending on the external conditions, is input to the AFIC 10.

The AFIC 10 is an integrated circuit (IC) and comprises a first signal processing circuit 11, a second signal processing circuit 12, a clamp circuit 13, an arithmetic circuit 14 and an integration circuit 15. The first signal processing circuit 11 inputs the signal I1+I0, which is output from the PSD 5, and after removing the component of the ambient light I0 included in the signal, outputs the short-range side signal I1; the second signal processing circuit 12 inputs the signal I2+I0, which is output from the PSD 5, and after removing the component of ambient light I0 included in the signal, outputs the short-range side signal I2.

The clamp circuit 13 inputs the long-range side signal I2, which is output from the second signal processing circuit 12, and compares the magnitude of the level between the clamp signal Ic, which is constant, and the long-range side signal I2, and when the former is larger, the clamp signal Ic is output; and if not so, the long-range side signal I2 is output as it is. Hereinafter, the signal output from the clamp circuit 13 is denoted by I2c. Here, it is assumed that the clamp signal Ic is substantially at the same level as that of the long-range side signal I2 corresponding to the distance L4 shown in FIG. 4.

The arithmetic circuit 14 inputs the short-range side signal I1, which is output from the first signal processing circuit 11, and the signal I2c, which is output from the clamp circuit 13 (any one of the long-range side signal I2 and the clamp signal Ic), calculates the output ratio (I1/(I1+I2c)), and outputs the result thereof. The integration circuit 15 inputs the output ratio and integrates the output ratio multiple times along with an integration capacitor 6, which is connected to the CINT terminal of the AFIC 10; thereby the S/N ratio is improved. Then, the integrated output ratio is output from the SOUT terminal of the AFIC 10 as AF signal.

The CPU 1 inputs the AF signal output from the AFIC 10, performs a predetermined calculation to convert the AF signal into a distance signal, and sends the distance signal to a lens drive circuit 7. The lens drive circuit 7 makes a photo taking lens 8 perform focusing operation based on the distance signal. The conversion calculation from the AF signal to the distance signal in the CPU 1 will be described later.

Figure 2:
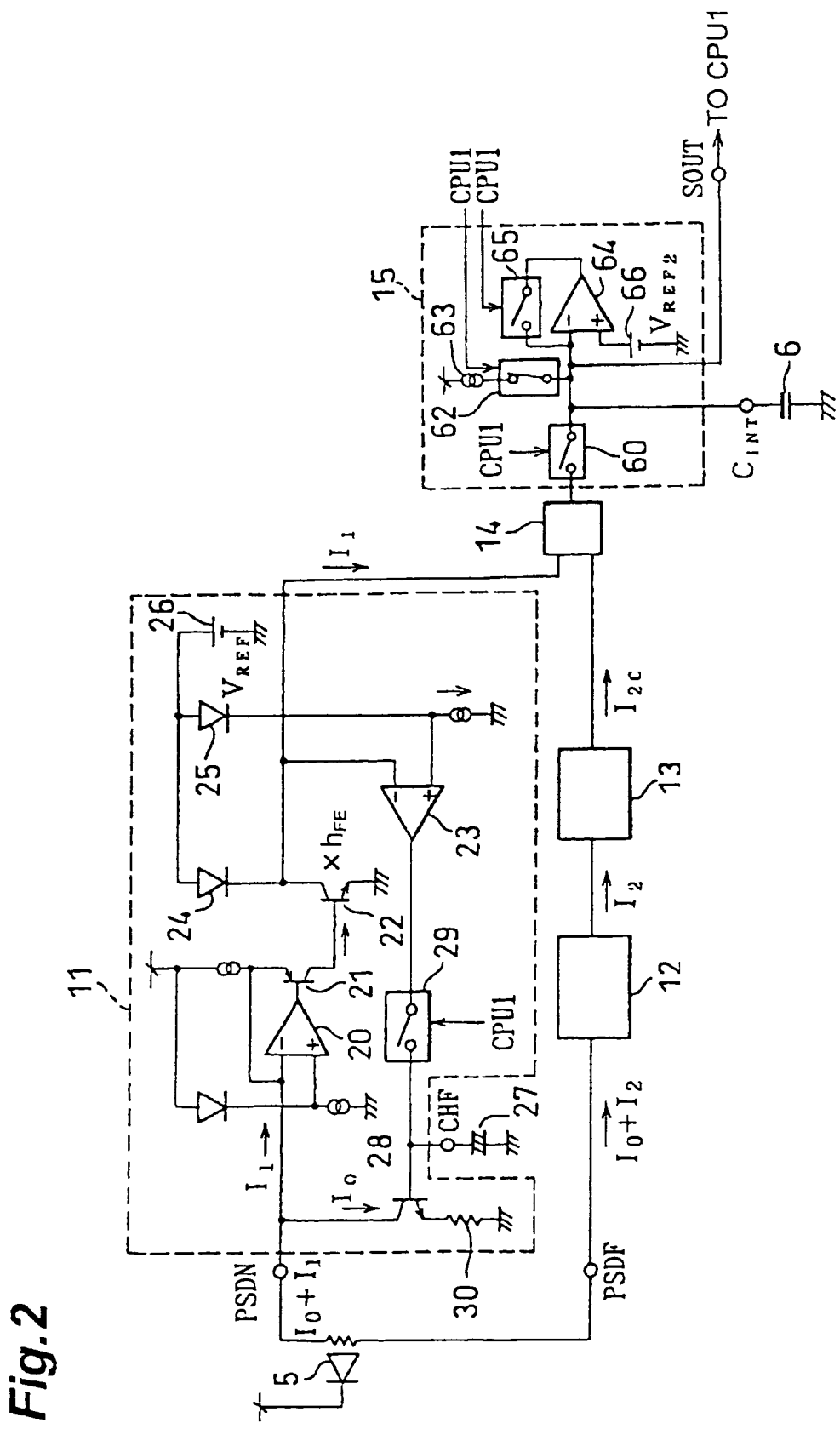
FIG. 2 is a diagram of the circuits of the first signal processing circuit and the integration circuit in the distance measuring device in accordance with the embodiment.
Figure 3:
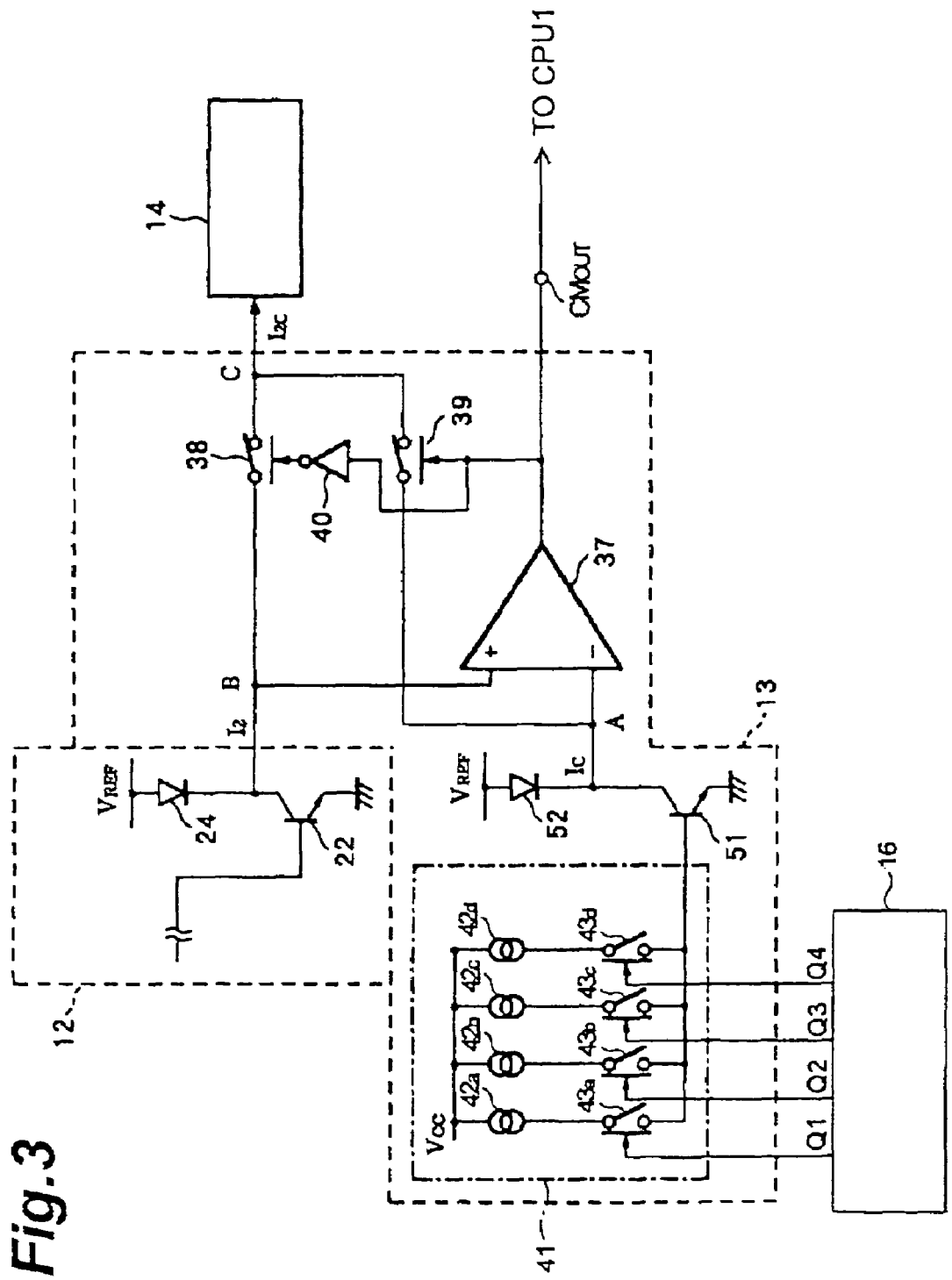
FIG. 3 is a diagram of the circuit of the clamp circuit in the distance measuring device in accordance with the embodiment.

Next, further concrete configuration of the circuits of the first signal processing circuit 11, the clamp circuit 13 and the integration circuit 15 in the AFIC 10 will be described. FIG. 2 is a circuit diagram of the first signal processing circuit 11 and the integration circuit 15 in the distance measuring device in accordance with the embodiment. FIG. 3 is a circuit diagram of the clamp circuit 13 in the distance measuring device in accordance with the embodiment. The second signal processing circuit 12 also has the same configuration of the circuit as that of the first signal processing circuit 11.

FIG. 2 shows the circuit diagram of the first signal processing circuit 11. The first signal processing circuit 11 inputs the short-range side signal I1 including the component of the ambient light I0, which is output from the PSD 5, and after removing the component of the ambient light I0, outputs the short-range side signal I1. The current (I1+I0), which is output from the near-side terminal of the PSD 5, is input to the negative input terminal of an operational amplifier 20 in the first signal processing circuit 11 through the PSDN terminal of the AFIC 10. The output terminal of the operational amplifier 20 is connected to the base terminal of a transistor 21; and the collector terminal of the transistor 21 is connected to the base terminal of the transistor 22. Connected to the collector terminal of the transistor 22 is the negative input terminal of the operational amplifier 23; and connected to the collector terminal is the cathode terminal of a compression diode 24. Further, connected to the positive input terminal of the operational amplifier 23 is the cathode terminal of a compression diode 25; and connected to the anode terminal of each of the compression diodes 24 and 25 is a first reference power supply 26.

Further, externally connected to the CHF terminal of the AFIC 10 is an ambient light removal capacitor 27. The ambient light removal capacitor 27 is connected to the base terminal of an ambient light removal transistor 28 in the first signal processing circuit 11. The ambient light removal capacitor 27 and the operational amplifier 23 are connected to each other being interposed by a switch 29. The CPU 1 controls the ON/OFF operation of the switch 29. The collector terminal of the ambient light removal transistor 28 is connected to the negative input terminal of the operational amplifier 20. The emitter terminal of the transistor 28 is connected to a resistance 30 of which another terminal is grounded.

FIG. 3 is a diagram showing a concrete configuration of the clamp circuit 13 in the AFIC 10.

As shown in FIG. 3, the clamp circuit 13 is provided with a comparator 37 for determining the level of the long-range side signal $I_2$. The positive input terminal of the comparator 37 is connected to the collector terminal of the transistor 22 in the second signal processing circuit 12, and connected to the input terminal of the arithmetic circuit 14 being interposed by a switch 38. On the other hand, the negative input terminal of the comparator 37 is, same as the transistor 22 and the compression diode 24, which are connected to the positive input terminal, connected to the collector terminal of the transistor 51 and the cathode terminal of the compression diode 52, and further connected to the input terminal of the arithmetic circuit 14 being interposed by a switch 39.

Further, connected to the base terminal of the transistor 51 is a clamp current source 41. To the clamp current source 41, a current generator 42a and a switch 43a are connected in series; a current generator 42b and a switch 43b are connected in series; a current generator 42c and a switch 43c are connected in series; and a current generator 42d and a switch 43d are connected in series; and the other ends of the switches 43a–43d are connected to the base terminal of the transistor 51.

For example, the current generator 42a, which outputs a constant current value of 0.125 nA; the current generator 42b, which outputs a constant current value of 0.25 nA; the current generator 42c, which outputs a constant current value of 0.5 nA; and the current generator 42d, which outputs a constant current value of 1.0 nA are used.

The switches 43a–43d are opened/closed being controlled by signals Q1–Q4, which are output from the clamp level switchover circuit 16. The clamp current source 41 inputs the clamp current, which is the sum of the currents from each of the current generators corresponding to the closed switches, to the base terminal of the transistor 51. The clamp current is used as the base current for the transistor 51; and collector potential corresponding to the magnitude thereof is input to the negative input terminal of the comparator 37.

The clamp current is appropriately set up during the manufacture of the distance measuring device.

Further, connected to the switch 39 is the output terminal of the comparator 37, and the output signal of the comparator 37 is input thereto. Furthermore, connected to the switch 38 being interposed by an inverter 40 is the output terminal of the comparator 37, and the output signal of the comparator 37 is inverted and input thereto. Accordingly, the switches 38 and 39 are in a relationship in which, when one is turned on, the other is turned off owing to the output signal of the comparator 37.

Further, the output signal of the comparator 37 is output from the AFIC 10 through the $CM_{OUT}$ terminal and input to the CPU 1. When the long-range side signal $I_2$ input to the positive input terminal is larger than the clamp signal Ic input to the negative input terminal, the output signal of the comparator 37 becomes a high potential signal. Contrarily, when the long-range side signal $I_2$ input to the positive input terminal is smaller than the clamp signal Ic input to the negative input terminal, the output signal of the comparator 37 becomes a low potential signal.

Therefore, the comparator 37 serves as output signal detection means that detects whether the output signal $I_{2C}$, which is output from the clamp circuit 13, is the long-range side signal $I_2$ or the clamp signal Ic.

The circuit configuration of the integration circuit 15 is shown in FIG. 2. The integration capacitor 6, which is externally connected to the CINT terminal of the AFIC 10, is connected to the output terminal of the arithmetic circuit 14 being interposed by a switch 60; connected to the current generator 63 being interposed by a switch 62; connected to the output terminal of the operational amplifier 64 being interposed by a switch 65; and further connected directly to the negative input terminal of the operational amplifier 64. The potential of the integration circuit 15 is output from the SOUT terminal of the AFIC 10. These switches 60, 62 and 65 are controlled by the control signal from the CPU 1. Further, connected to the positive input terminal of the operational amplifier 64 is a second reference power supply 66.

The operation of the AFIC 10, which is constituted as described above, will be described with reference to FIG. 2 and FIG. 3. When the light is not emitted from the IRED 4, the CPU 1 turns on the switch 29 of the first signal processing circuit 11. Here, the component of the ambient light I0, which is output from the PSD 5 is input to the first signal processing circuit 11, the current thereof is amplified by the current amplifier, which is comprised of the operational amplifier 20 and transistors 21 and 22, subjected to a logarithmic compression by the compression diode 24 to be converted into a voltage signal, and the voltage signal is input to the negative input terminal of the operational amplifier 23. When the signal input to the operational amplifier 20 is large, since the VF of the compression diode is large, the signal output from the operational amplifier 23 is large. Accordingly, the capacitor 27 is charged. Then, since the base current is supplied to the transistor 28, the collector current flows to the transistor 28. Thus, in the signal I0, which has been input to the first signal processing circuit 11, the signal, which is input to the operational amplifier 20, is small. In this state where the closed loop operation is stable, the entire signal IO, which has been input to the first signal processing circuit 11 flows into the transistor 28, and in the capacitor 27, the electric charge corresponding to the base current at that time is accumulated.

When the CPU 1 makes the IRED 4 emit light and the switch 29 turn off, the component of ambient light I0 in the signal I1+I0, which is output from the PSD 5, flows to the transistor 28, which has been applied with the base potential due to the electric charge accumulated in the capacitor 27, as the collector current. The current of the short-range side signal I1 is amplified by the current amplifier, which is comprised of the operational amplifier 20 and the transistors 21 and 22, subjected to a logarithmic compression by the compression diode 24, converted into a current signal and output therefrom. That is, from the first signal processing circuit 11, only the short-range side signal I1, from which the component of the ambient light I0 has been removed, is output. The short-range side signal I1 is input to the arithmetic circuit 14. On the other hand, in the second signal processing circuit 12 also, same as the first signal processing circuit 11, only the long-range side signal I2, from which the component of the ambient light I0 has been removed, is output, and the long-range side signal I2 is input to the clamp circuit 13.

The long-range side signal I2, which has been input to the clamp circuit 13, is input to the positive input terminal of the comparator 37 for determination in the clamp circuit 13. The signal output from the clamp current source 41, which has been previously set up during the adjustment of the camera, flows as the base current for the transistor 51; and the potential (clamp signal Ic) of the collector terminal in the transistor 51, which is generated accompanying therewith, is input to the negative ambient input terminal of the comparator 37 for determination. The magnitude of the long-range side signal I2 and the clamp signal Ic are compared by the comparator 37 for determination, and based on the result thereof, one of the switches 38 and 39 is turned on, and the other is turned off. That is, when the long-range side signal I2 is larger than the clamp signal Ic, the switch 38 is turned on, the switch 39 is turned off, and the long-range side signal I2 is output as the output signal 12*c* of the clamp circuit 13. When the relationship of the magnitude thereof is inversed, the switch 38 is turned off, the switch 39 is turned on, and the clamp signal Ic is output as the output signal I2*c* of the clamp circuit 13.

The signal I2*c* output from the clamp circuit 13 and the short-range side signal I1 output from the first signal processing circuit 11 are input to the arithmetic circuit 14, the output ratio (I1/(I1+I2*c*)) is calculated by the arithmetic circuit 14 and output therefrom, and the output ratio is input to the integration circuit 15. At the beginning of the distance measurement, the switches 60 and 62 are turned off, and the switch 65 is turned on for a predetermined period of time, and the integration capacitor 6 is charged to a potential of the reference voltage $V_{REF2}$ in the second reference power supply 66. When the IRED 4 emits the pulse light predetermined number of times, the switch 60 of the integration circuit 15 is turned on; the switches 62 and 65 are turned off; the integration capacitor 6 is discharged and integrated by the output ratio signal, which is output from the arithmetic circuit 14; and the potential of the integration capacitor 6 is reduced in a step manner. And, when the emission of the pulse light of predetermined number of times is completed, the switch 60 is turned off; and the switch 62 is turned on; thus, the potential of the integration capacitor 6 is charged and increased by inversed integration using a constant current, which is supplied from the current generator 63. The CPU 1 monitors the potential of the integration capacitor 6 and measures the time required for recovering the potential of the original potential $V_{REF2}$; calculates the AF signal based on the time, and further calculates the distance to the object to be measured.

Figure 4:
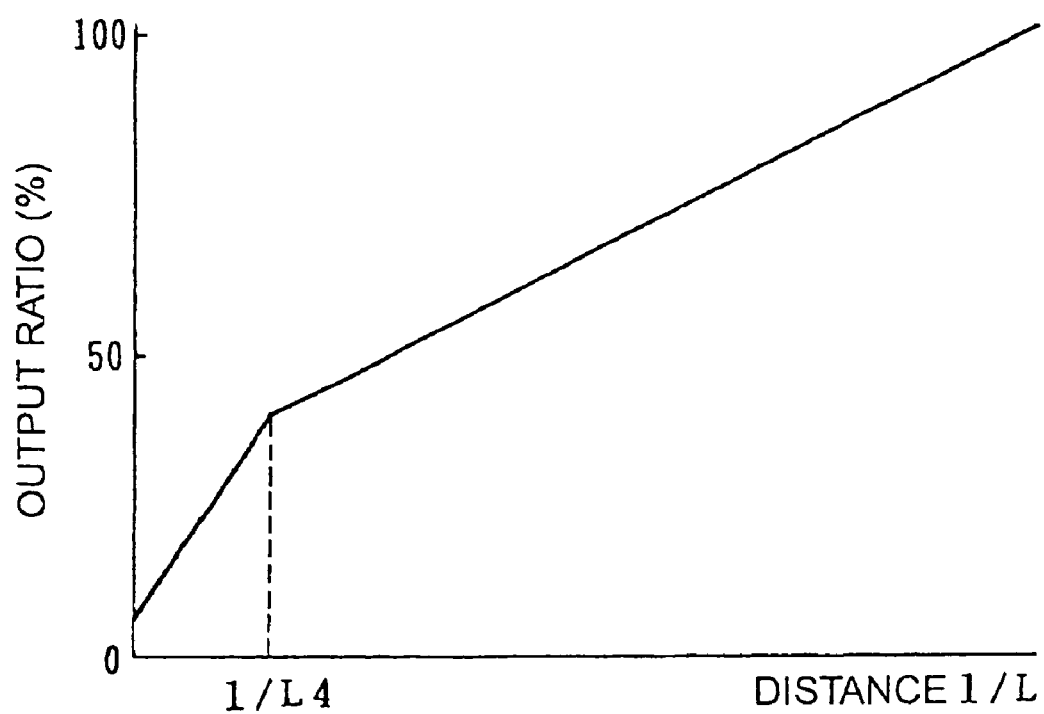
FIG. 4 is a diagram showing the relationship between the AF signal, which is output from the integration circuit of the distance measuring device in accordance with the embodiment, and the distance to the object to be measured.

The relationship between the AF signal and the distance L to the object to be measured, which is obtained as described above, is shown in FIG. 4. FIG. 4 is a diagram showing the relationship between the AF signal, which is output from the integration circuit of the distance measuring device in accordance with the embodiment, and the distance to the object to be measured. In the graph shown in FIG. 4, the abscissa axis represents reciprocal (1/L) of the distance L to the object to be measured; the ordinate axis represents the output ratio (I1/(I1+I2)), i.e., AF signal. As shown in FIG. 4, when the distance L to the object to be measured is smaller than a distance L4 (L≦L4) the signal, which is output from the clamp circuit 13, is I2; the output ratio is I1/(I1+I2); and the output ratio with respect to the reciprocal (1/L) of the distance L is in a substantially linear relationship. Accordingly, when the distance L is large (1/L is small), the output ratio is small. Also, when the distance L is larger than the distance L4 (L≧L4), the signal, which is output from the clamp circuit 13 is Ic; the output ratio is I1/(I1+Ic). In this case also, when the distance L is large, the output ratio is small. Thus, by using the clamp circuit 13, the distance L to the object to be measured can be determined uniquely and stably from the output ratio (AF signal).

Figure 5:
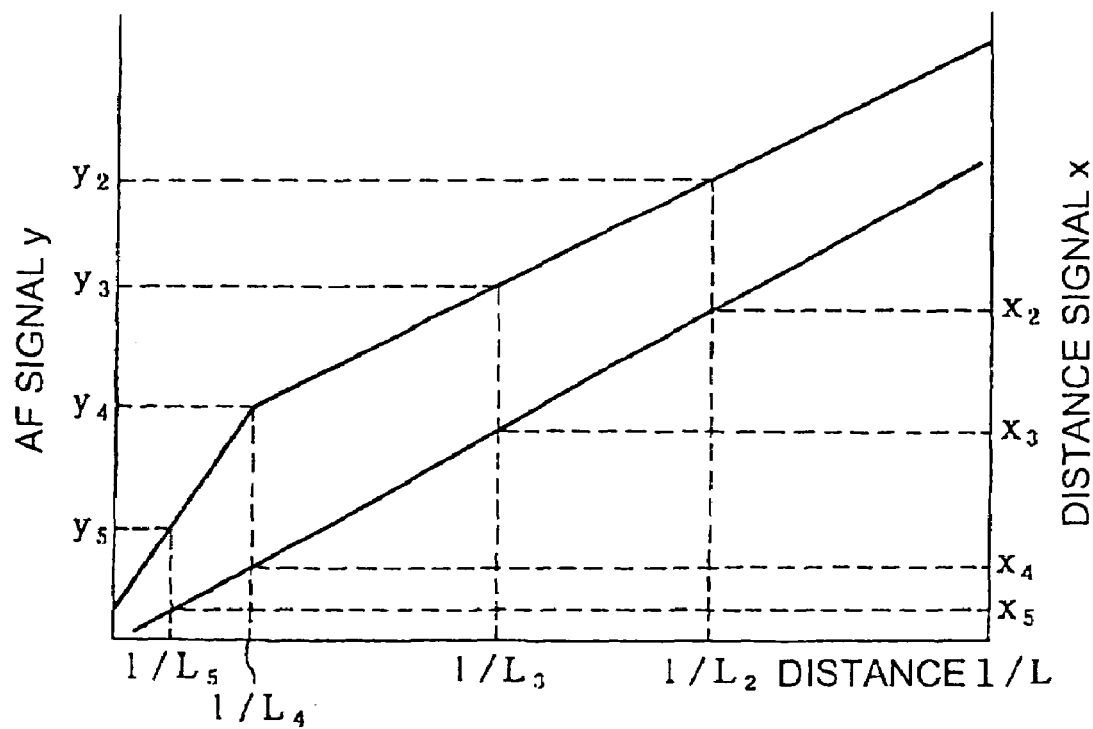
FIG. 5 is a diagram showing the conversion from the AF signal to the distance signal in the distance measuring device in accordance with the embodiment.

Based on the AF signal, which is obtained as described above, the CPU 1 operates to obtain a distance signal, which represents the driving amount of the photographic lens 8, and sends the distance signal to the lens drive circuit 7 to make the photographic lens 8 perform the focusing operation. FIG. 5 is a diagram showing the conversion from the AF signal to the distance signal in the distance measuring device in accordance with the embodiment. In the graph shown in FIG. 5, the abscissa axis represents the reciprocal (1/L) of the distance L to the object to be measured; the left ordinate axis represents the AF signal; and the right ordinate axis represents the distance signal. The graph shows the relationship between the distance L and the AF signal and the relationship between the distance L and the distance signal respectively. With respective to each of the distances L2, L3, L4 and L5 (L2<L3<L4<L5), the AF signals y2, y3, y4 and y5 and, distance signals x2, x3, x4 and x5 correspond respectively.

Here, in each of the range of distance L≦L4 and the range of distance L>L4, with respect to the reciprocal (1/L) of the distance L, the AF signal is in a substantially linear relationship. Also, in the full range of the distance L, with respect to the reciprocal (1/L) of the distance L, the distance signal is in a substantially linear relationship. Accordingly, in each of the range of distance L≦L4 and the range of distance L>L4, the relationship between the AF signal and the distance signal is also in a substantially linear relationship.

Figure 6:
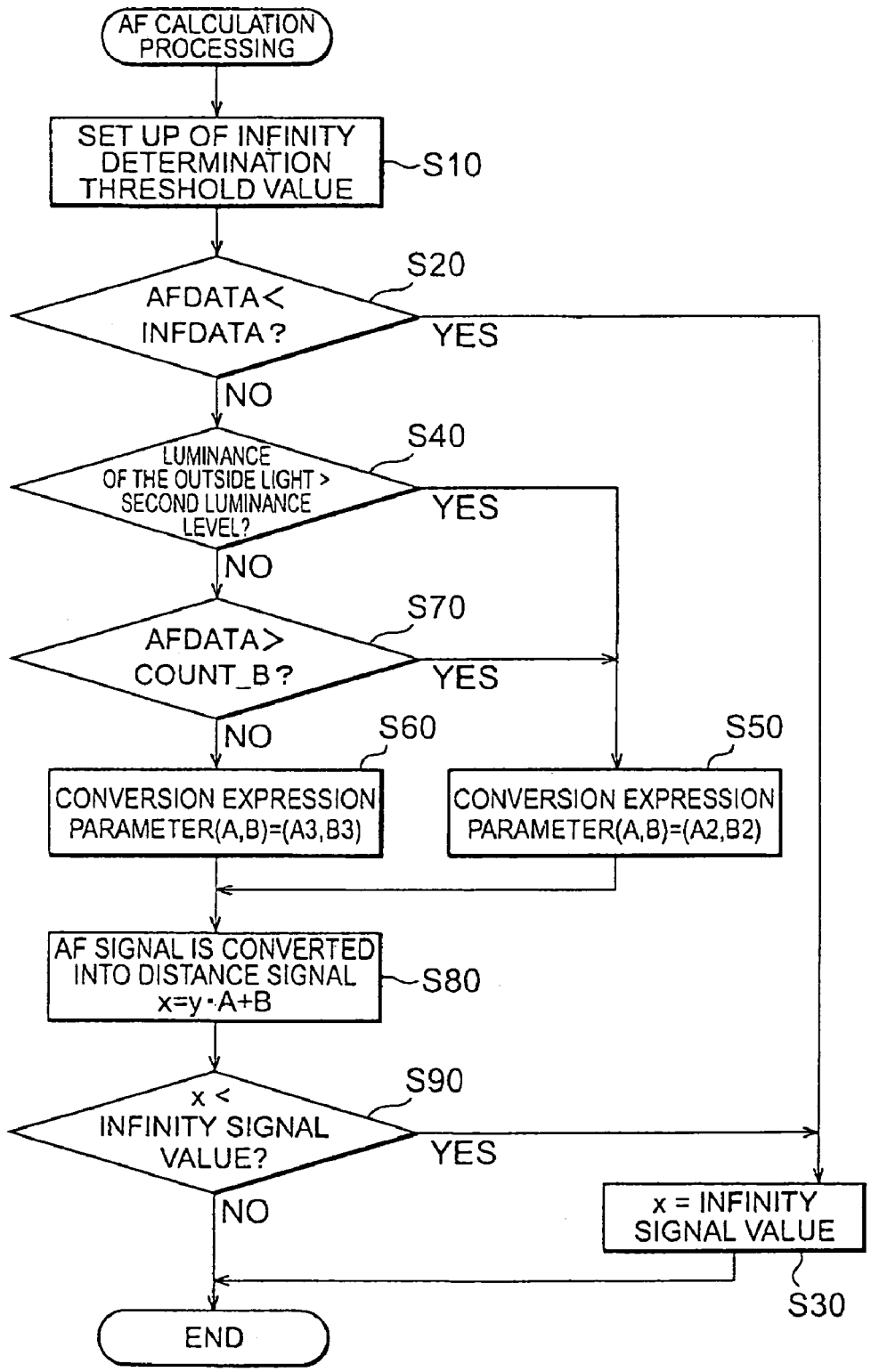
FIG. 6 is a flow chart showing the distance signal calculation process in accordance with the first embodiment.
Figure 9:
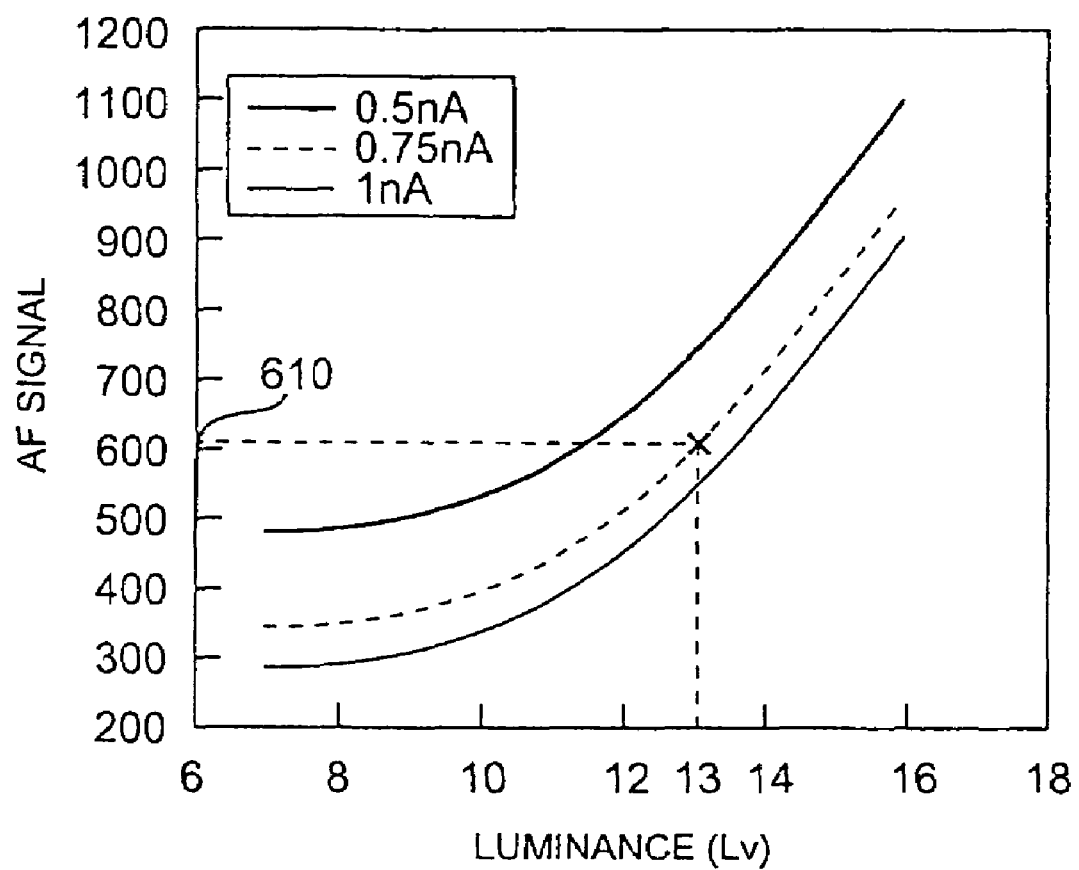
FIG. 9 is a graph showing the AF signal value with respect to the external luminance.

Here, the processing to calculate the distance signal (hereinafter, represented by "x") from the obtained AF signal (hereinafter, represented by "y") in the CPU 1 will be described with reference to FIG. 6. First of all, the CPU 1 sets up an infinity determination threshold value (INF-DATA) corresponding to the level of the luminance of the outside light, which is obtained from the photometry sensor 71. That is, the lower the luminance of the outside light is, the more the infinity determination threshold value is set up at the long-range side; the higher the luminance of the outside light is, the more the infinity determination threshold value is set up at the short-range side (step FIG. 9 is a graph showing a relationship between the luminance of the outside light, which is obtained by the photometry sensor 71, and the AF signal corresponding thereto, which is obtained by the PSD 5. That is, the relationship between the AF signal output from the AFIC 10 and the luminance in the state where the object to be measured is located at a position equivalent to the infinite long distance (the state where the infrared light emitted from the IRED 4 does not reach the PSD 5 as reflected light) is represented. The graph shown in FIG. 9 is prepared beforehand by obtaining average data of the relationship between the luminance of the outside light and the AF signal using plural prototypes of the camera. The graph in FIG. 9 is prepared by, for example, after sealing AF window (light projection) 22a with a light shielding tape, measuring the AF signal while changing the luminance of the outside light. Here, while measuring the luminance of the outside light, the corresponding AF signals may be measured in the field; or, after setting the camera faced to a luminance box, the AF signal may be measured while changing the luminance. Each of the three curves represents the case of 0.5 nA, 0.75 nA and 1 nA, respectively, in the level of the clamp signal. For example, in the camera of which clamp signal level is set to 0.75 nA, the infinity determination threshold value is obtained based on the curve of 0.75 nA in FIG. 9. For example, in the case where the luminance of the outside light is Lv13, an AF signal value corresponding thereto on the curve is selected and the infinity determination threshold value is set to 610. In the curves shown in FIG. 9, the higher luminance results in the larger AF signal value. Accordingly, as a result, the lower luminance of the outside light is, the more the infinity determination threshold value is set at the long-range side; the higher luminance of the outside light is, the more the infinity determination threshold value is set at the short-range side.

In the above example, the infinity determination threshold value is continuously set up based on the curve in FIG. 9. However, the following method may be adopted; i.e., for example, by setting a reference luminance level (first luminance level) and by comparing the magnitude of the luminance of the outside light therewith, the setting value of the infinity determination threshold is divided into two steps based on the comparison result. For example, when the luminance of the outside light is lower than the first luminance level, the infinity determination threshold value may be set to a first level value; when the luminance thereof is higher than that, the same may be set to a second level value. However, in this case, the first luminance level is set to a level that corresponds to a luminance lower than the second luminance level, which will be described later. This example will be described later as a second embodiment.

When the AF signal obtained from the AFIC 10 is smaller than the above-described infinity determination threshold value (at long range side), the infinity signal value (AFINF) is set up as the distance signal and the processing is terminated (step S20, step S30). The wording "infinity signal value" means a distance signal value that corresponds to a limited distance, which is predetermined based on the viewpoint of designing of the camera so that the infinity signal value falls in a predetermined out-of-focus range up to the infinity. It is arranged so that, when the obtained AF signal indicates a distance longer than a predetermined distance, the above-described processing is carried out. Thereby, even in the case of long distance, a stable focusing operation of the photographic lens 8 can be made.

Next, a conversion expression for converting from an AF signal to a distance signal in accordance with the level of the luminance of the outside light is determined (step S40). The conversion expression for converting an AF signal "y" into a distance signal "x" is expressed by the following expression:

$$X = y \cdot A + B$$

Two different combinations of the parameters A and B in this expression is previously prepared; i.e., (A, B)=(A2, B2) and (A, B)=(A3, B3). And, it is determined first which combination should be adopted in accordance with the level of the luminance of the outside light, which is obtained from the photometry sensor 71.

Referring to the reference letters and numerals in FIG. 5, the prepared parameters A2 and B2 are expressed by the following expressions (1) and (2), and conversion expression thereof is expressed by (3).

$$A2 = (x3 - X2)/(y3 - y2) \qquad (1)$$

$$B2 = X2 - y2 \cdot A2 \qquad (2)$$

$$X = y \cdot A2 + B2 \qquad (3)$$

Referring to the reference letters and numerals in FIG. 5, the prepared parameters A3 and B3 are expressed by the following expressions (4) and (5), and conversion expression thereof is expressed by (6).

$$A3 = (X5 - X4)/(y5 - y4) \qquad (4)$$

$$B3 = X4 - y4 \cdot A3 \qquad (5)$$

$$X = y \cdot A3 + B3 \qquad (6)$$

As demonstrated by the above expressions, the combination (A, B)=(A2, B2) is converted into a distance signal at the long range side longer than the combination (A, B)=(A3, B3).

When the luminance of the outside light obtained from photometry sensor 71 is higher than a predetermined second luminance level, the (A, B)=(A2, B2) is adopted (step S50); in the case of other than the above, the combination (A, B)=(A3, B3) is adopted (step S60). Also, even when the luminance of the outside light is lower than the second luminance level, when the value of the AF signal "X" is larger than an AF signal, which corresponds to the clamping effect Y/N determination reference level COUNT_B, which is determined by the reference object reflectance (36%) (shorter range side), the combination (A, B)=(A2, B2) is adopted (step S70). As for the reference object reflectance, the distance L corresponding to the clamping effect Y/N determination reference level COUNT_B is L4, and the COUNT_B is equal to y4. That is, in the range of distance L≦L4, the combination (A, B)=(A2, B2) is adopted (step S70, step S60).

That is, summarizing the above described processing to select parameters for the conversion expression; in the case where the luminance of the outside light is in the range of low and medium luminance, in the range of L≦L4, (A, B)=(A2, B2) is selected; and in the range of L>L4, (A, B)=(A3, B3) is adopted. On the other hand, in the high luminance range, in every rage of L, (A, B)=(A2, B2) is adopted.

Based on the adopted conversion expression (3) or (6), the AF signal y is converted into a distance signal x (step S80). Here, the converted distance signal x is checked if the same is not smaller than the infinity signal value AFINF (at long range side), and when the same is smaller, the infinity signal value AFINF is reset as the distance signal, the processing is terminated (step S90, step S30).

The parameters A2 (expression (1)), B2 (expression (2)), A3 (expression (4)) and B3 (expression (5)), and a standard range of the luminance of the outside light (i.e., determination criterion for selecting which conversion expression should be selected from the expressions (3) and (6)) are obtained for each camera, in which the distance measuring device is incorporated, during the manufacturing thereof, and previously stored in the EEPROM 2 or the like. These parameters are read out by the CPU 1 at distance measurement, and the calculation of expression (3) or (6) is carried out; and thus, the AF signal "y" is converted into distance signal "x".

As describes above, in the distance measuring device in accordance with the embodiment, when the luminance of the outside light is in a low luminance range, and when precise distance measurement in a long range is relatively easy, the infinity determination threshold value is set up at the long range side. Accordingly, since the distance signal corresponding to the distance can be obtained without performing the infinity determination up to the limit, an appropriate reachable distance can be ensured; and thus, the distance measuring property in the long range is increased.

Figure 7:
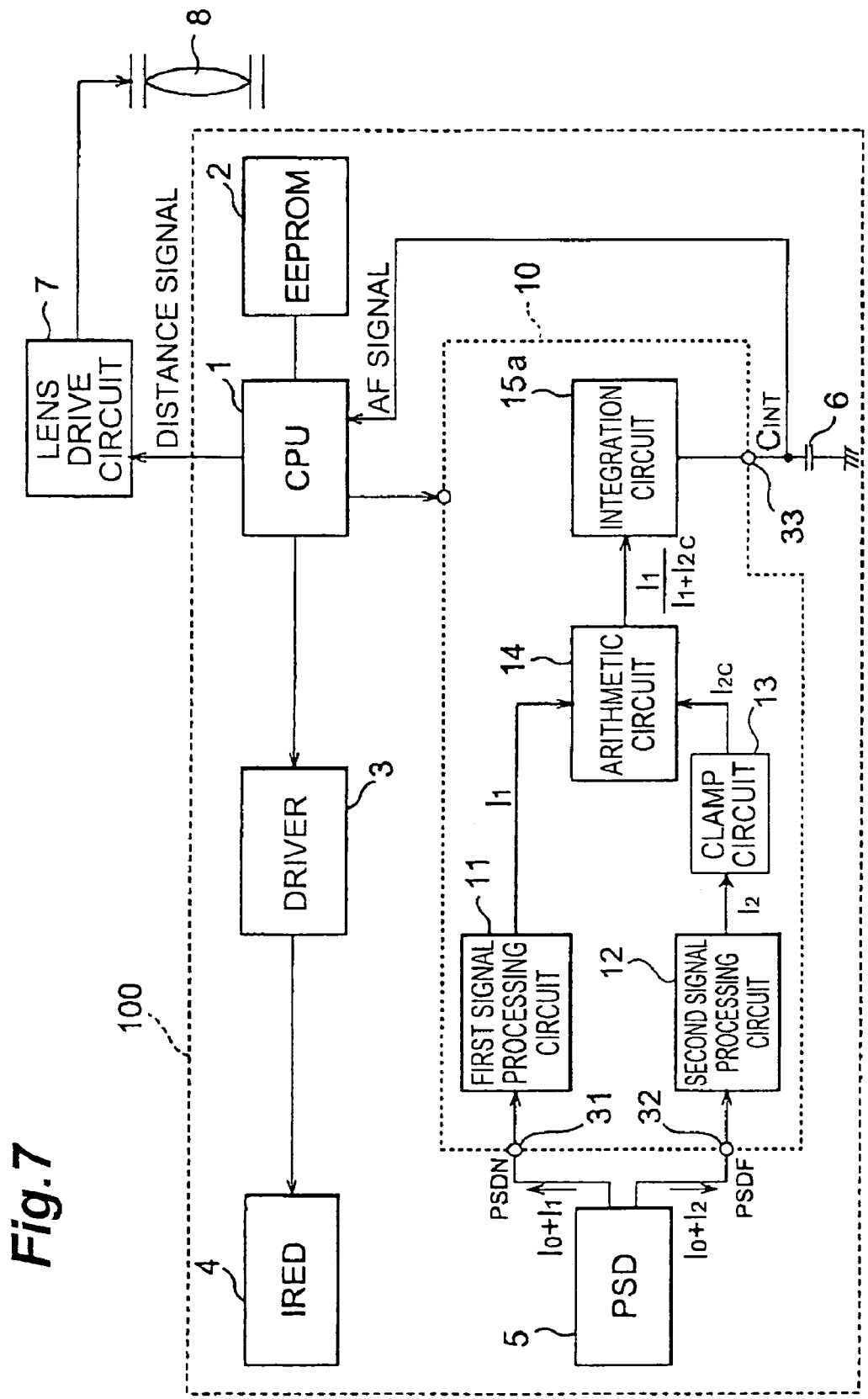
FIG. 7 is a diagram showing the configuration of a modification of the distance measuring device in accordance with the embodiment.

In the above-described embodiment, when converting the output ratio signal into the AF signal, the potential of the integration capacitor 6 is monitored to obtain the AF signal using the integration circuit 15 based on the time required to recover to the pervious potential. However, as shown in FIG. 7, an integration circuit 15a may be used in place of the integration circuit 15.

In this case, the integration circuit 15a receives the input of an output ratio signal (a distance calculation value) and integrates the output ratio multiple times along with the integration capacitor 6, which is connected to a $C_{INT}$ terminal 33 of the AFIC 10; thereby the S/N ratio is improved. And the CPU 1 receives the integrated output ratio as the AF signal (distance measuring data). When the CPU 1 receives the AF signal from the AFIC 10, the CPU 1 performs a predetermined calculation to convert the AF signal into the distance signal, and sends the distance signal to the lens drive circuit 7. The lens drive circuit 7 makes the photographic lens 8 carry out the focusing operation based on the distance signal.

Figure 8:
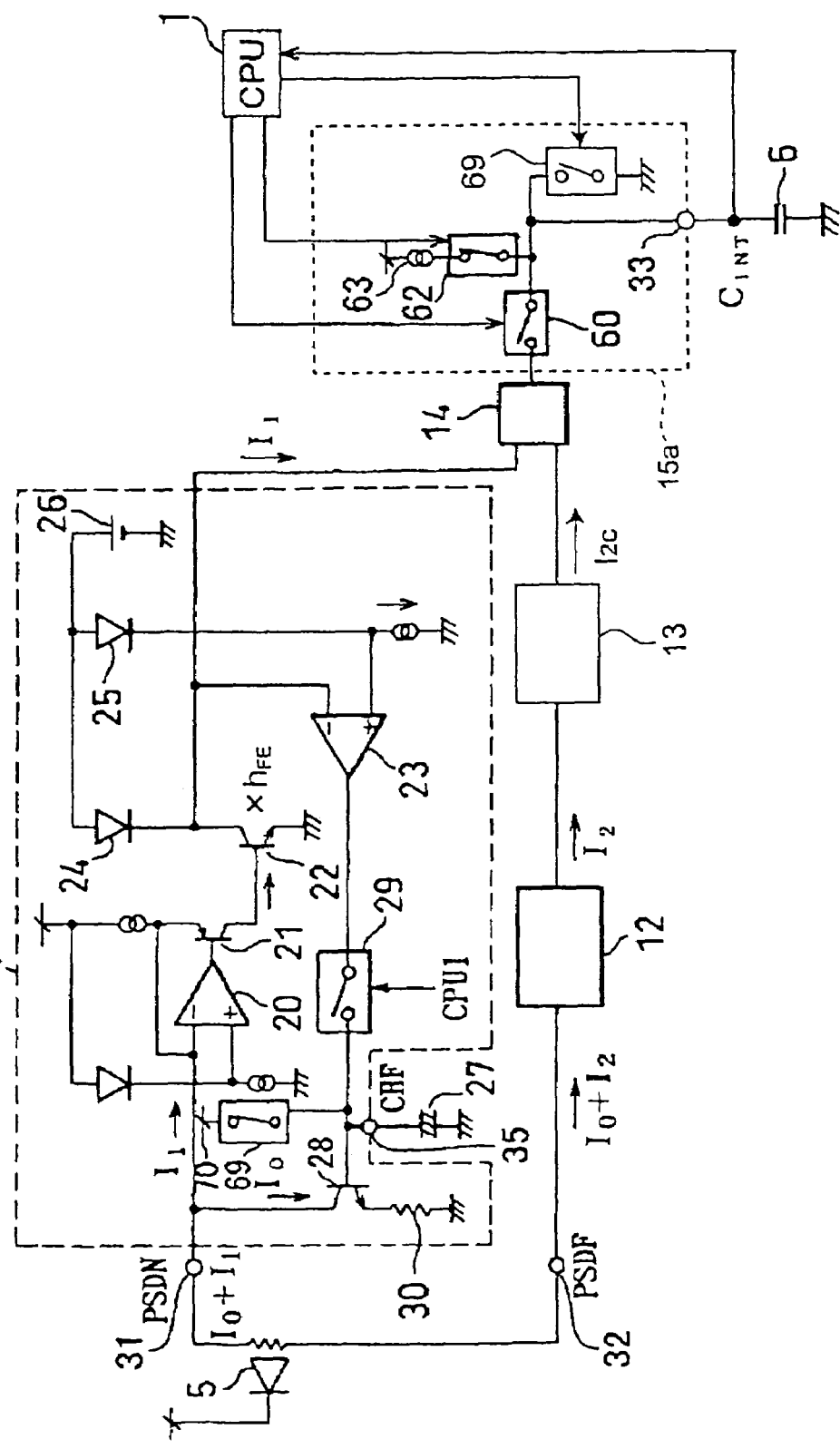
FIG. 8 is a circuit diagram of the first signal processing circuit and output circuit in a modification of the distance measuring device in accordance with the embodiment.

The integration circuit 15a has the following configuration. Referring to FIG. 8, the integration capacitor 6, which is externally connected to the $C_{INT}$ terminal 33 of the AFIC 10, is connected to the output terminal of the arithmetic circuit 14 being interposed by the switch 60, connected to the current generator 63 being interposed by the switch 62 and grounded being interposed by the switch 69. The CPU 1 reads out the potential of the integration capacitor 6 as described above. The switches 60, 62, and 69 are controlled by the control signal from the CPU 1.

At the beginning of the distance measurement, the switches 60 and 62 are turned off, and the switch 69 is turned on for a predetermined period of time, and the integration capacitor 6 is discharge to 0 volts. When the IRED 4 emits pulse light predetermined times, the switch 60 of the integration circuit 15a is turned on, and the switches 62 and 69 are turned off. The integration capacitor 6 of the integration circuit 15a receives the output ratio; i.e., the distance calculation value, which is output from the arithmetic circuit 14, and is charged up to the voltage value corresponding to the value of the distance calculation value. Owing to this, the voltage of the integration capacitor 6 increases in a step-like pattern being input with the distance calculation value every time of light emission of the IRED 4. The increasing amount of the voltage itself in a step-like pattern is the distance information corresponding to the distance to the object to be measured. However, in this embodiment, the sum of the increased voltage, which is obtained by each pulse light emission of the IRED 4, is used as the distance information.

After completing the input to the integration capacitor 6 with the distance calculation value of predetermined times of light emission, the switch 60 is turned off and the CPU 1 A/D converts the voltage of the integration capacitor 6 to read the same, and reads out the integration result of the distance calculation value as the AF signal (distance measuring data).

Next, a second embodiment of the present invention will be described. In this embodiment, the entire constitution of the distance measuring device, the configuration of the particular circuits such as the first signal processing circuit 11, the clamp circuit 13 and the integration circuit 15 of the AFIC 10, and the basic calculation process of the distance signal are the same as those in the first embodiment. Only the following process is different from the first embodiment; i.e., in the calculation process of the distance signal, the infinity determination threshold value is determined based on the luminance of the outside light.

Figure 10:
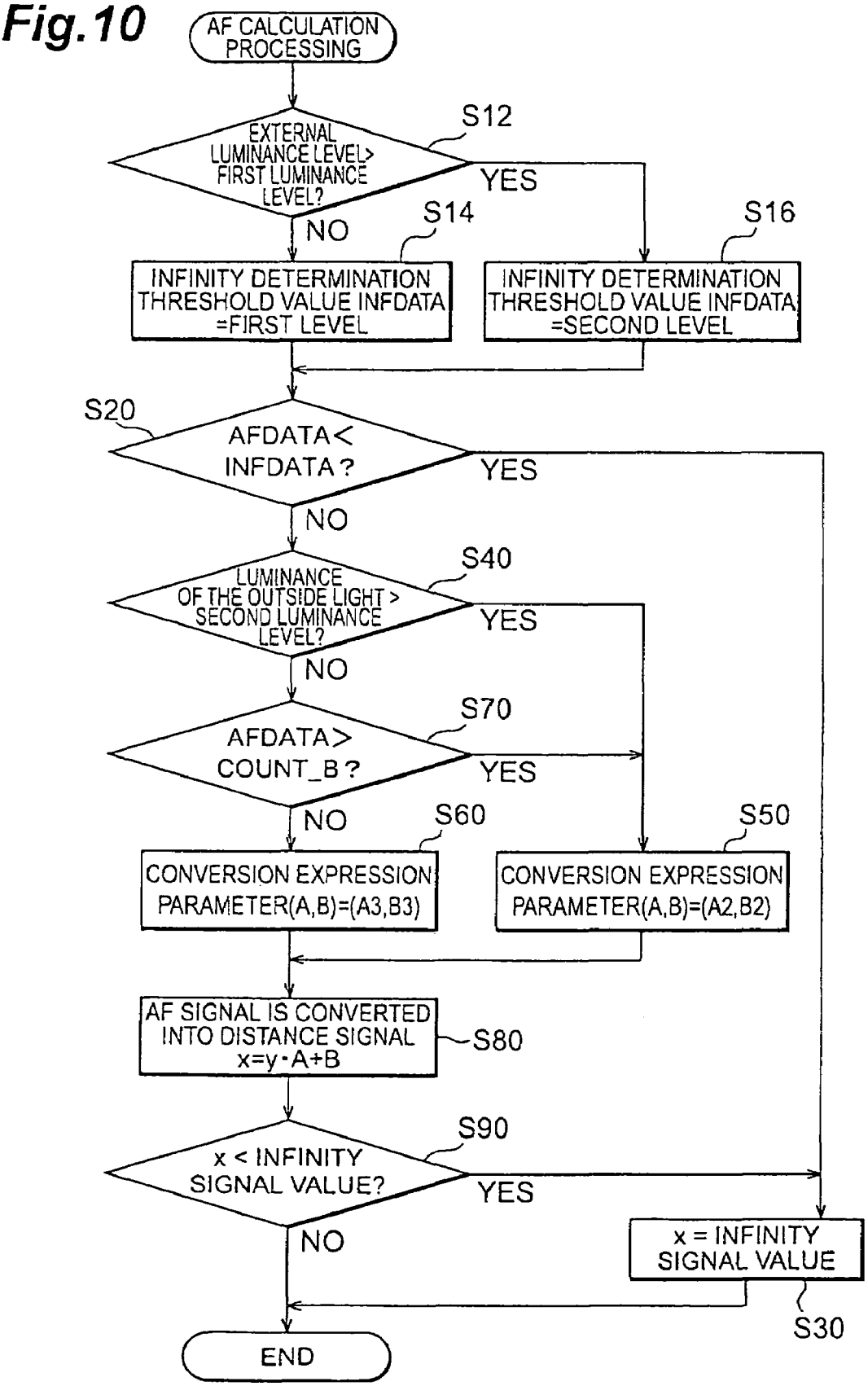
FIG. 10 is a flow chart of the distance signal calculation process in accordance with the second embodiment.

In the first embodiment, it is arranged so that the infinity determination threshold value is set up continuously based on the curve shown in FIG. 9. On the other hand, in the second embodiment, it is arranged so that a luminance level, which serves as the reference (first luminance level), is determined, the magnitude thereof is compared to that of the luminance of the outside light, and based on the result, the setting value of the infinity determination threshold value is divided into two steps. Here, as for the first luminance level, for example, such luminance that the noise of external light reaches the threshold value of the AF signal is selected. In the embodiment, when the luminance of the outside light is lower than Lv12 (first luminance level), the infinity determination threshold value is set up to INFDATA=535 (first level value); and when the luminance is higher than Lv12, the infinity determination threshold value is set up to INFDATA=837 (second level value) (FIG. 10, steps S12, S14 and S16).

In this case, the second luminance level, which serves as the reference to select the conversion expression for converting the AF signal "y" into distance signal "x", is set to Lv15, which is higher than the above-mentioned first luminance level. That is, as shown in FIG. 11, as the processing in which the distance signal "x" is calculated from the AF signal "y", the luminance of the outside light is classified into three ranges based on the luminance of the outside light; i.e., lower than Lv12 (hereinafter, referred to as "low luminance range"); Lv12–15 (hereinafter, referred to as "medium luminance range"); and higher than Lv15 (hereinafter, referred to as "low luminance range").

As described above, by setting the infinity determination threshold value, not using a continuous value, but in two steps only, the capacity of the program and the processing time can be saved. Likewise, not only the method in which the infinity determination threshold value is divided into two steps, but also a method in which the infinity determination threshold value is divided into multiple steps more than three steps may be adopted.

Figure 12A:
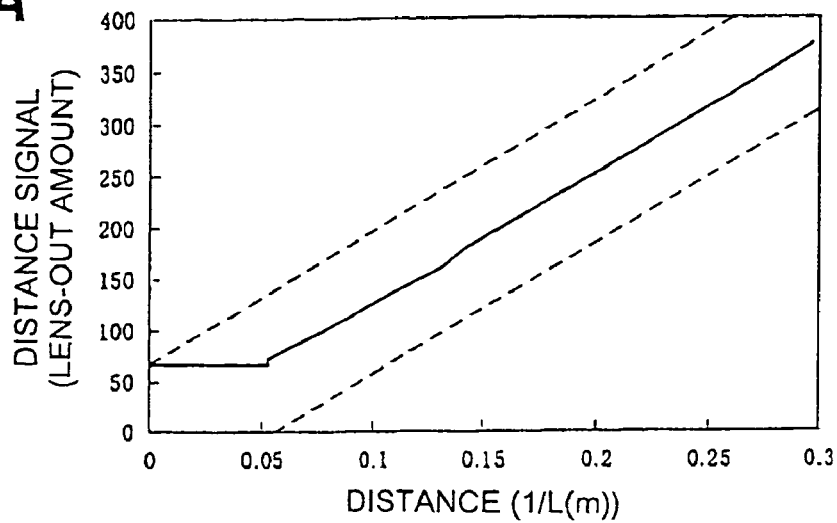
FIGS. 12A–12C are graphs showing the relationship between the distance and the distance signal when a distance measurement is made under a condition of a standard object reflectance.
Figure 12B:
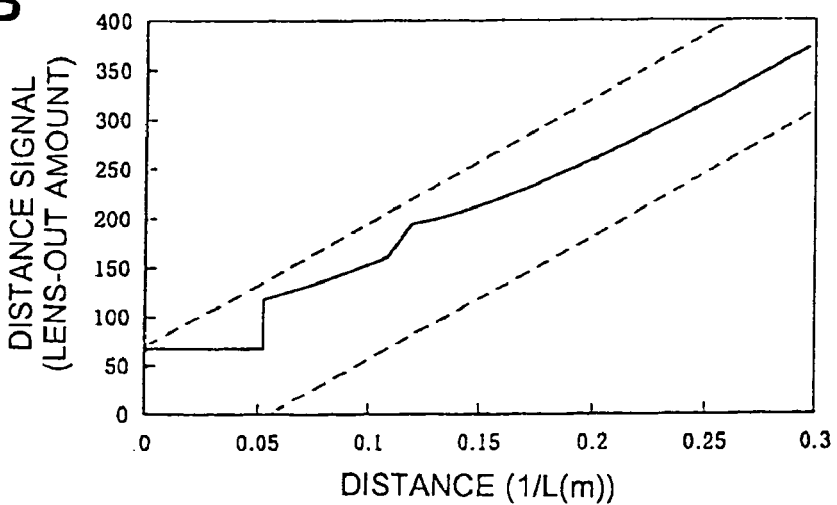
Figure 12C:
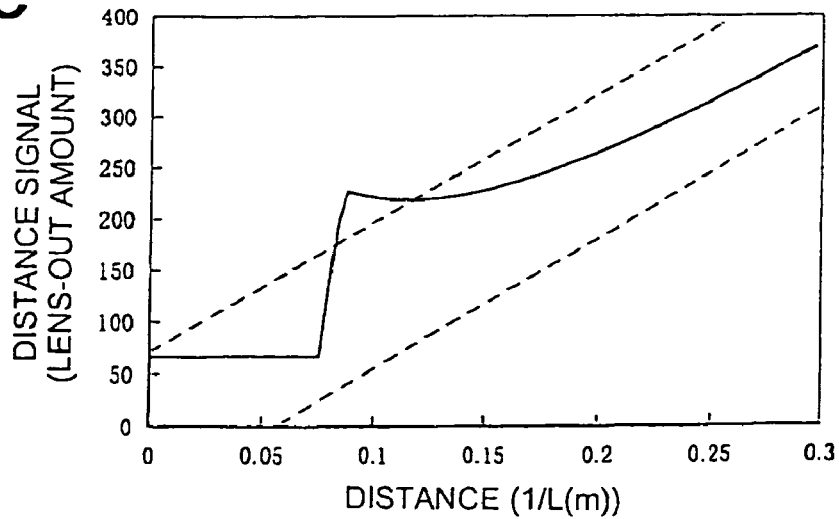

Next, the calculation results in the distance measuring device in accordance with the second embodiment will be explained. FIGS. 12A–12C are graphs showing the relationship between the distance and the distance signal when a distance measurement is made using the above-described distance measuring device under a condition of 36% object reflectance. FIG. 12A shows a result of the distance measurement under a condition of low luminance of the outside light (Lv=7); FIG. 12B shows a result of the distance measurement under a condition of medium luminance of the outside light (Lv=14); and FIG. 12C shows a result of the distance measurement under a condition of high luminance of the outside light (Lv=16). Further, the area enclosed by the two broken lines in FIG. 12 indicates the allowable range of error in the distance measurement.

Figure 14A:
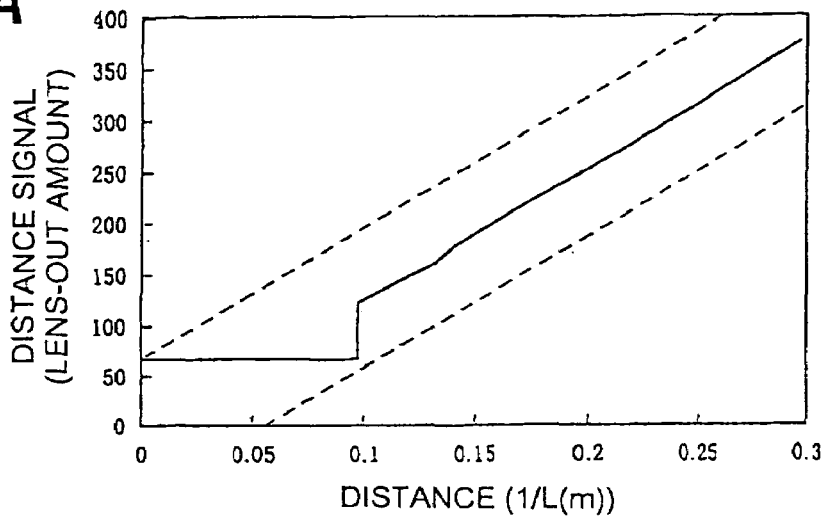
FIGS. 14A–14C show graphs for demonstrating the relationship between the distance and the distance signal when the distance measurement is made using a conventional distance measuring device under a condition of standard object reflectance.
Figure 14B:
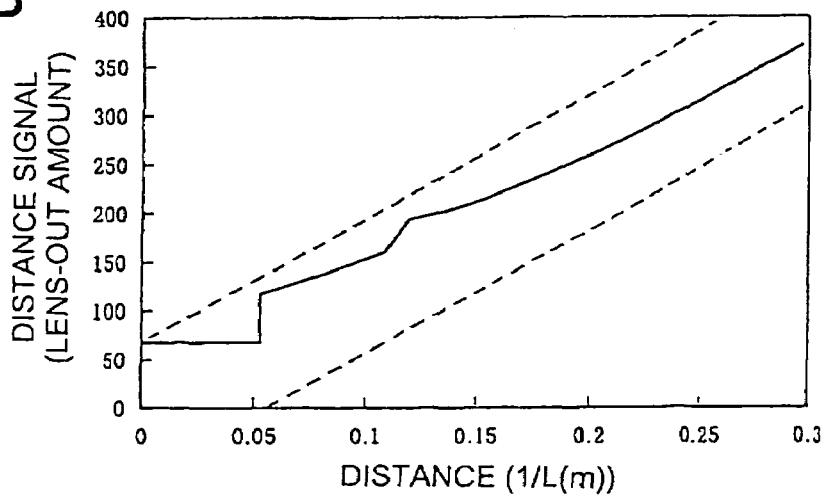
Figure 14C:
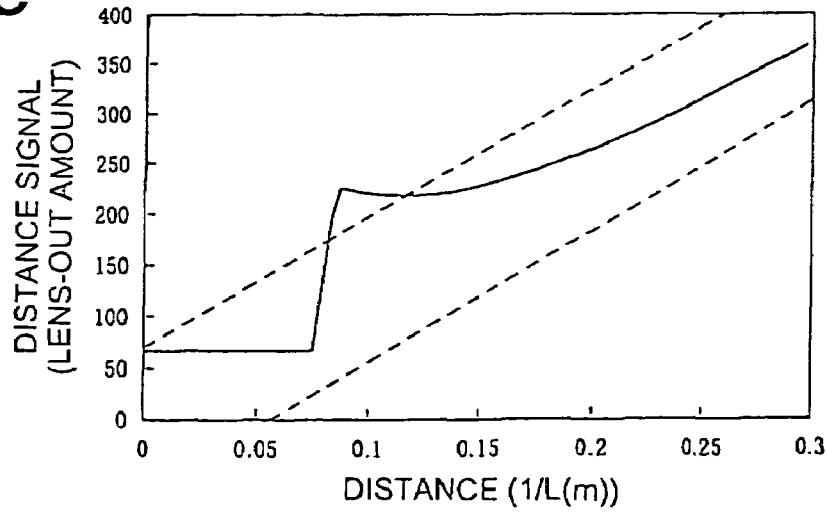

In this calculation, since the luminance of the outside light is in the low luminance range, the infinity determination threshold value is set to a first level value corresponding to the long-range side longer than the conventional threshold value. Here, the first level value is an AF signal value equivalent to the distance signal=67. In the conventional distance measuring device, since the infinity determination threshold value is set to an AF signal value equivalent to distance signal=118, in the range longer than 1/L=0.1, every distance signal value is converted into the infinity setting value (refer to FIG. 14A). On the other hand, in the distance measuring device in accordance with the second embodiment, as shown in FIG. 12A, the infinity determination is not made up to the distance of 1/L=0.05; thus, substantially linear relationship between the distance signal and the distance is obtained. That is, when the luminance of the outside light is in the low luminance range, the long-range distance measuring property is increased, and the reachable distance is also appropriately ensured.

Figure 13A:
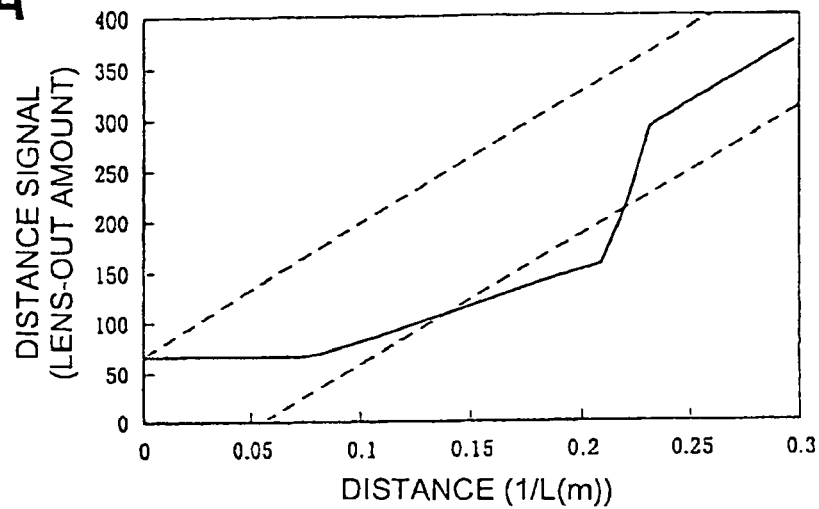
FIGS. 13A–13C are graphs showing the relationship between the distance and the distance signal when distance measurement is made using the above-described distance measuring device under a condition of low object reflectance.
Figure 13B:
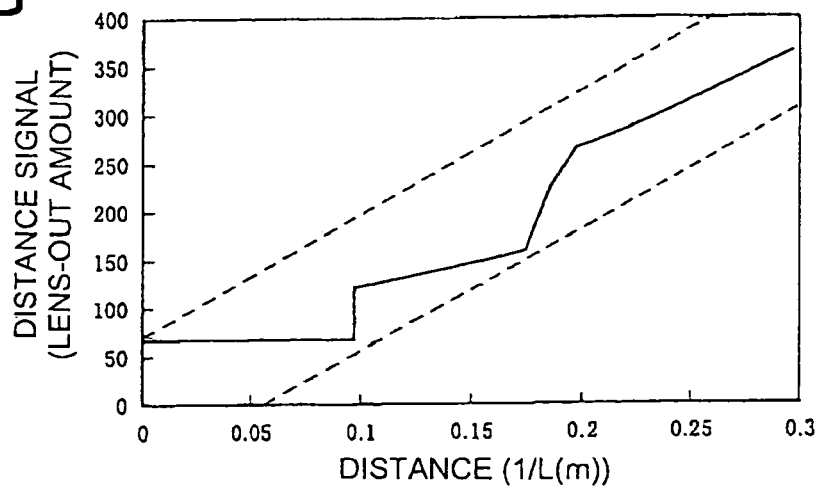
Figure 13C:
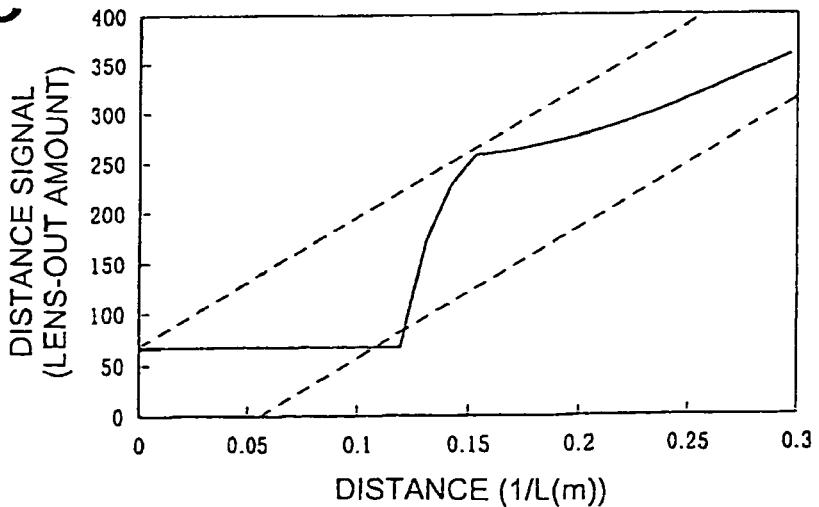
Figure 15A:
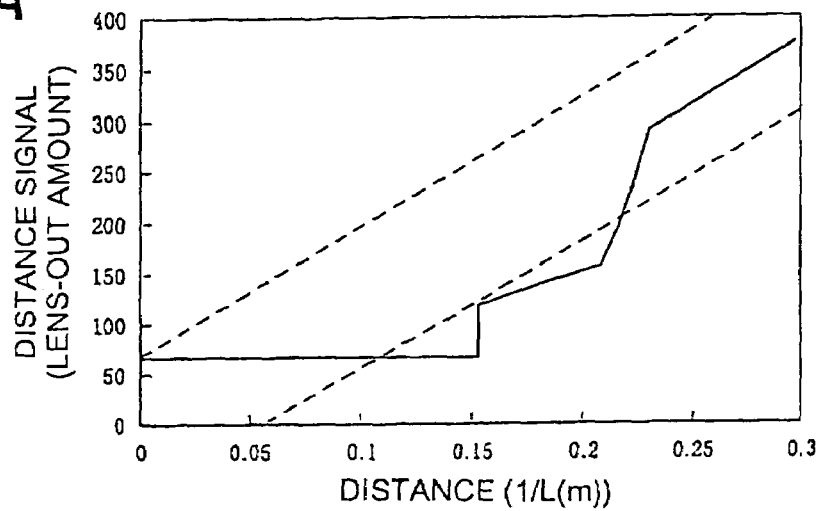
FIGS. 15A–15C are graphs, which represent the relationship between the distance and the distance signal when the distance measurement is made under a condition of 9% object reflectance using the above distance measuring device.
Figure 15B:
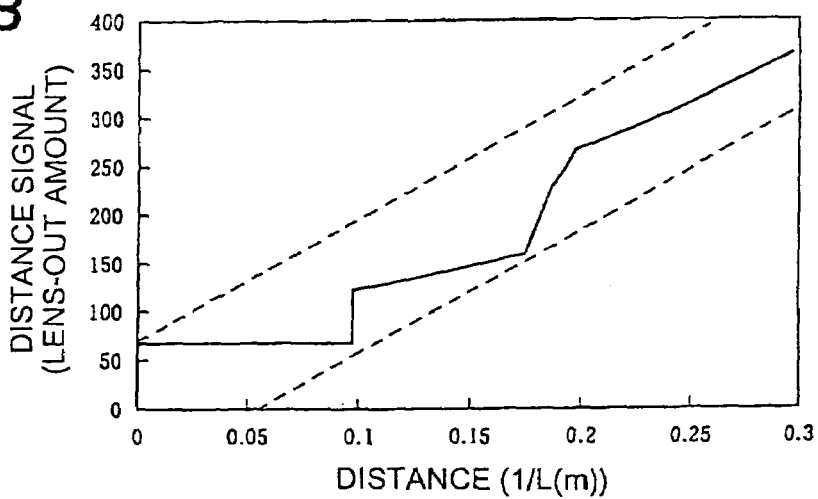
Figure 15C:
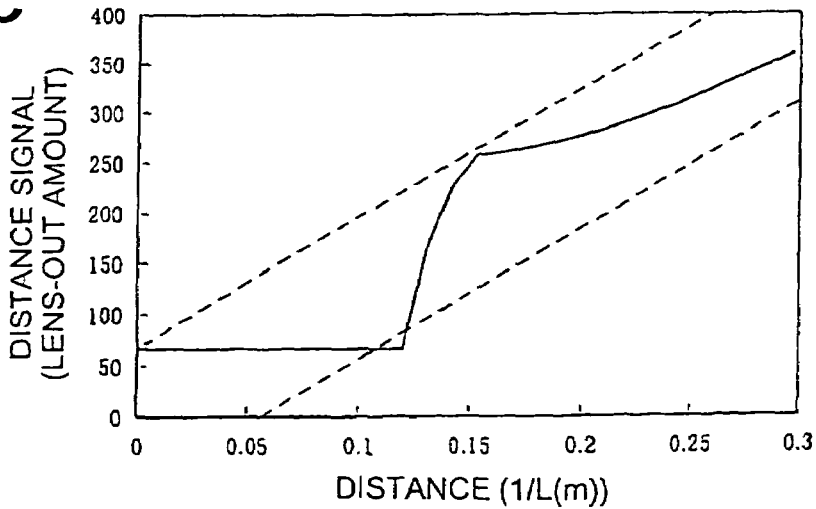

FIGS. 13A–13C are graphs showing the distance measuring result under a condition of low object reflectance, and the relationship between the distance and the distance signal when distance measurement is made using the above-described distance measuring device under a condition of object reflectance 9% is shown. FIG. 13A shows the result of distance measurement under a condition in which the luminance of the outside light is low luminance (Lv=7); FIG. 13B shows the result of distance measurement under a condition in which the luminance of the outside light is medium luminance (Lv=14); and FIG. 13C shows the result of distance measurement under a condition in which the luminance of the outside light is high luminance (Lv=16). Further, the area enclosed by the two broken lines in FIG. 13 indicates the allowable range of error in the distance measurement. In the conventional distance measuring device, in which the infinity determination threshold value is fixed to an AF signal value equivalent to the distance signal=118, in the long range of 1/L=0.15 or more, every distance signal value is converted into the infinity setting value. Accordingly, the allowable range of error in distance measurement is exceeded in a wide range (refer to FIG. 15(*a*)). On the other hand, as shown in FIG. 13A, the infinity determination is not made up to approximately 1/L=0.07; thus, it is demonstrated that the part which exceeds the allowable range of error in distance measurement is largely reduced. That is, the distance measuring property and reachable distance in the long range when the luminance of the outside light is in the low luminance range is considerably increased; particularly in the case where the object reflectance is low.

FIG. 12C is a graph showing the relationship between the distance and the distance signal when distance measurement is made using the above-described distance measuring device under a condition that the outside light is high luminance (Lv=16) and the object reflectance is 36%. In the graph showing the relationship between the distance and the distance signal obtained from the conventional distance measuring device under the identical condition (FIG. 16C), the error in distance measurement exceeds the allowable range in the distance of 1/L=0.05–0.07. However, referring to FIG. 12C, the error in distance measurement in the same distance is improved and the part where exceeds the allowable range is reduced.

Also, in the distance measuring device in accordance with the embodiment, it is arranged so that, in the calculation of the distance signal, the conversion expression is changed depending on the luminance of the outside light. In the case when the luminance of the outside light is in the high luminance range, the AF signal is apt to fall in the short-range side due to the influence of the luminance of the outside light. However, owing to that arrangement, in the case of high luminance range, the AF signal is converted to a distance signal of the long range side resulting in an improvement thereof.

Figure 16A:
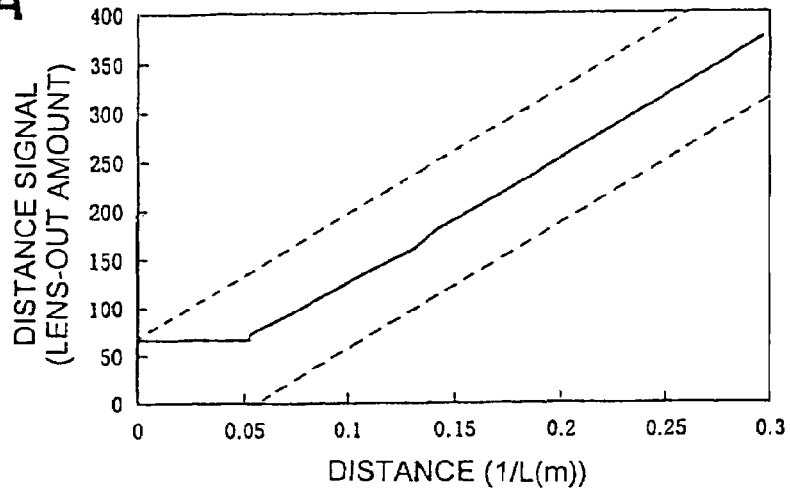
FIGS. 16A–16C are graphs, which represent the relationship between the distance and the distance signal when the distance measurement is made under a condition of 9% object reflectance using the above distance measuring device.
Figure 16B:
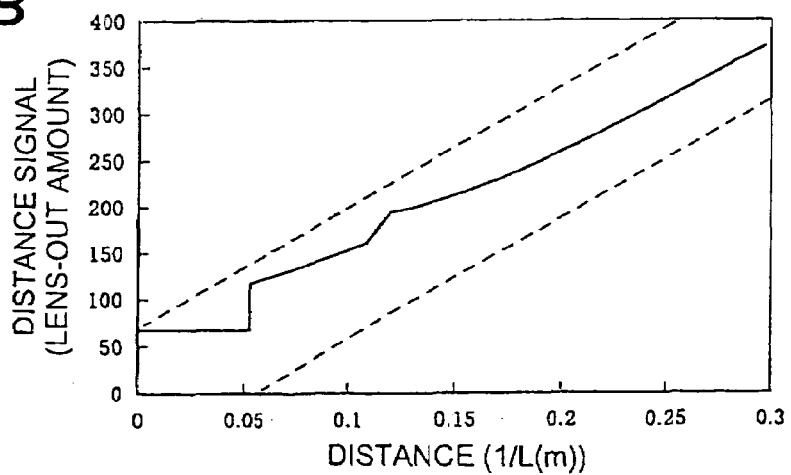
Figure 16C:
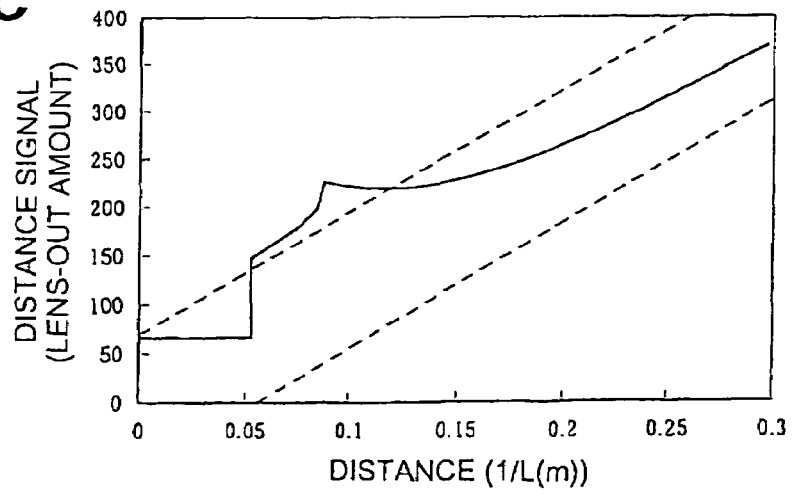

When the luminance of the outside light in the high luminance range, as shown in FIG. 16C, the range of permissible circle of confusion is exceeded in the range of 1/L=0.05–0.7 due to the luminance of the outside light. However, in the high luminance range, when such range is converted, since the conversion expression parameter (A, B)=(A2, B2) is used to convert the same into the distance signal of the long range side being improved as shown in FIG. 12C. As a result, the part where is included in the range of the permissible circle of confusion is increased.

As described in detail, when the luminance of the outside light is low, particularly when the object reflectance is low, the distance measuring device in accordance with the embodiment is superior in the accuracy of long range measurement and ensures an appropriate reachable distance.

The present invention is not limited to the above-described embodiments, but various modifications are possible. For example, in the distance measuring device of the above embodiments, the clamp circuit 13 that compares the magnitude between the long-range side signal I2, which is output from the second signal processing circuit 12, and the clamp signal Ic of a fixed level and outputs either one of the signals is included. The present invention is applicable to a distance measuring device, which does not have any clamp circuit, but directly inputs and calculates the short-range side signal and the long-range side signal in the arithmetic circuit.

As described above in detail, according to the present invention, a distance measuring device that ensures the reachable distance in case of low luminance of the outside light and is capable of obtaining satisfactory distance measuring property in the long range can be provided.

What is claimed is:

1. A distance measuring device comprising:
    light emitting means that projects a beam of light onto an object to be measured;
    light detecting means that detects the light reflected from the object, at a light detecting position corresponding to the distance to the object, and, based on the light detecting position, outputs a long-range side signal that increases in value as the object is positioned farther away from the distance measuring device at a certain intensity of the detected light, and a short-range side signal that increases in value as the object is positioned closer to the distance measuring device at a certain intensity of the detected light;
    calculation means that calculates a ratio between the short-range side signal and the long-range side signal and outputs an output ratio signal;
    luminance measuring means that measures luminance of the outside light;
    threshold setting means that adjusts an infinity determination threshold value such that the infinity determination threshold value is set at a value corresponding to a farther position as lower luminance is measured by said luminance measuring means, and the infinity determination threshold value is set at a value corresponding to a closer position as a higher luminance is measured by said luminance measuring means; and
    conversion means that compares the output ratio signal with the infinity determination threshold value to determine whether the output ratio signal corresponds to a shorter range side rather than of the infinity determination threshold value, and, if so, converts the output ratio signal into a distance signal using a predetermined conversion formula, and, if not converts the output ratio signal into a predetermined distance signal having a fixed value.

2. A distance measuring device comprising:
    light emitting means that projects a beam of light onto an object to be measured;
    light detecting means that detects the light reflected from the object, at a light detecting position corresponding to the distance to the object, and, based on the light detecting position, outputs a long-range side signal that increases in value as the object is positioned farther away from the distance measuring device at a certain intensity of the detected light, and a short-range side signal that increases in value as the object is positioned closer to the distance measuring device at a certain intensity of the detected light;
    clamping means that compares the long-range side signal with a clamp signal, and, when the long-range side signal is larger than the clamp signal, outputs the long-range side signal; and, when the long-range side signal is smaller than the clamp signal, outputs the clamp signal;
    calculation means that calculates a ratio between the short-range side signal and a signal output from said clamping means and outputs an output ratio signal;
    luminance measuring means that measures luminance of outside light;
    threshold setting means that adjusts an infinity determination threshold value such that the infinity determination threshold value is set at a value corresponding to a farther position as lower luminance is measured by said luminance measuring means, and the infinity determination threshold value is set at a value corresponding to a closer position as a higher luminance is measured by said luminance measuring means; and
    conversion means that compares the output ratio signal with the infinity determination threshold value to determine whether the output ratio signal corresponds to a shorter range side rather than of the infinity determination threshold value, and, if so, converts the output ratio signal into a distance signal using a predetermined conversion formula, and, if not, converts the output ratio signal into a predetermined distance signal having a fixed value.

3. The distance measuring device according to claim 1 wherein, when the luminance of the outside light measured by said luminance measuring means is lower than a predetermined first luminance level, said threshold setting means sets the infinity determination threshold value at a first level value, and when the luminance of the outside light is higher than the first luminance level, sets the infinity determination threshold level at a second level value corresponding to a position that is closer to said distance measuring device than the position associated with the first level value.

4. The distance measuring device according to claim 2 wherein, when the value of the output ratio signal corresponds to a shorter range side than the value of the infinity determination threshold value, said conversion means.
- when the value of the output ratio signal corresponds to a shorter range side than the value of a clamping effect determination reference level, converts the output ratio signal into the distance signal using a first conversion formula,
- when the value of the output ratio signal corresponds to a longer range side than the value of the clamping effect determination reference level and the luminance of the outside light measured by said luminance measuring means is higher than a predetermined second luminance level, converts the output ratio signal into the distance signal using the first conversion formula, and
- when the value of the output ratio signal corresponds to the longer range side than the value of the clamping effect determination reference level and the luminance of the outside light measured by said luminance measuring means is lower than the second luminance level, converts the output ratio signal into the distance signal using a second conversion formula, wherein the first conversion formula converts the output ratio signal into a distance signal corresponding to the farther position from said distance measuring device than does the second conversion formula.

5. The distance measuring device according to claim 4, wherein the clamping effect determination reference level is defined by using an object with a standard reflectance.

6. The distance measuring device according to claim 5, wherein the reflectance is 36%.

* * * * *